United States Patent [19]
Tomita et al.

[11] Patent Number: 5,488,603
[45] Date of Patent: Jan. 30, 1996

[54] OPTICAL INFORMATION RECORDING REPRODUCING APPARATUS WITH FIRST AND SECOND ELECTROKINETIC TRANSDUCERS AT RESPECTIVE DISTANCES

[75] Inventors: Hironori Tomita; Tohru Nakamura; Takuya Wada, all of Katano; Hiroyuki Nakamura, Kobe, all of Japan

[73] Assignee: Matsushita Electric Industrial Co., Ltd., Kadoma, Japan

[21] Appl. No.: 261,739

[22] Filed: Jun. 17, 1994

[30] Foreign Application Priority Data

Jun. 21, 1993 [JP] Japan .................................. 5-174739

[51] Int. Cl.$^6$ ................................................ G11B 7/095
[52] U.S. Cl. .......................... 369/219; 359/814; 359/824; 369/44.16
[58] Field of Search ............................. 369/44.14–44.16, 369/112, 219, 244, 247, 250, 253, 255; 359/813–814, 823–824

[56] References Cited

U.S. PATENT DOCUMENTS 5,373,496 12/1994 Tomita et al. .................... 369/44.15 X

FOREIGN PATENT DOCUMENTS 59-221839 12/1984 Japan .

Primary Examiner—W. R. Young
Attorney, Agent, or Firm—Renner, Otto, Boisselle & Sklar

[57] ABSTRACT

An optical information recording/reproducing apparatus for optically writing and reproducing information on a disk-shape recording medium according to the present invention includes: a base; an objective lens for converging a light beam on the disk-shape recording medium, an optical axis of the objective lens being perpendicular to the disk-shape recording medium; an actuator for actuating the objective lens along an optical axis direction in which the optical axis of the objective lens extends and along a radial direction of the disk-shape recording medium, wherein the actuator is fixed on the base and includes a lens holder for supporting the objective lens, and a first electrokinetic type transducer and a second electrokinetic type transducer for driving the lens holder along the optical axis direction and/or the radial direction of the disk-shape recording medium, the first and second electrokinetic type transducers interposing the lens holder, and a distance between the first electrokinetic type transducer and the base being different from a distance between the second electrokinetic type transducer and the base; and an optical member for directing a light beam to travel between the first electrokinetic type transducer and the base and to be incident on the objective lens.

38 Claims, 17 Drawing Sheets

OPTICAL INFORMATION RECORDING REPRODUCING APPARATUS WITH FIRST AND SECOND ELECTROKINETIC TRANSDUCERS AT RESPECTIVE DISTANCES

BACKGROUND OF THE INVENTION

1. Field of the Invention

The present invention relates to an optical information recording/reproducing apparatus, and particularly to an objective lens actuator for an optical information recording/reproducing apparatus capable of optically writing and reading information on a disk-shape recording medium.

2. Description of the Related Art

An optical information recording/reproducing apparatus capable of optically writing and reading information on/from a disk-shape recording medium such as a magneto-optical disk records information, and reads information recorded, in a desired portion of a rotating recording medium by converging a light beam on the recording medium. When conducting the recording/reproducing of information, focusing errors may occur due to up-down motions of the warps of the disk-shape recording medium, and tracking errors due to eccentricity or the like of the disk-shape recording medium may occur. Such errors can be corrected by actuating an objective lens, which is used for converging a light beam, in a direction perpendicular to the surface of the recording medium (hereinafter referred to as "focusing direction F") and/or in a radial direction parallel to the surface of the recording medium (hereinafter referred to as "tracking direction T").

In recent years, there have been trends towards both the portable use and the personal use of an optical information recording/reproducing apparatus such as a miniature disk (MD) player or a data file device employing a magneto-optical disk. Accordingly, it is desirable to further reduce the size, in particular the thickness, of an objective lens actuator incorporated for actuating the objective lens in the focusing direction F and/or the tracking direction T.

FIGS. 23 and 24 show an exemplary configuration for a conventional objective lens actuator.

An objective lens 1 is supported by a lens holder 2. The optical axis of the objective lens 1 coincides with the focusing direction F. The objective lens 1 is disposed at a predetermined distance from the surface of a disk 15, in accordance with various factors such as the designs of the objective lens 1 and the focal length of the objective lens 1. A magnetic yoke 3b is fixed on a base 10. A magnet 4b is attached to a portion of the lens holder 2 where it faces the magnetic yoke 3b. A focusing coil 5b and a tracking coil 6b are wound around the magnetic yoke 3b, so that a magnetic circuit is constituted by the focusing coil 5b, the tracking coil 6b, the magnetic yoke 3b, and the magnet 4b. As a result of a driving force generated by this magnetic circuit, the lens holder 2 is moved in the focusing direction F and/or the tracking direction T. Moreover, the lens holder 2 is supported by elastic members 7a to 7d. The elastic members 7a to 7d are disposed substantially in parallel to one another. One end of each of elastic members 7a to 7d is attached to the lens holder 2 via a printed circuit board 8a or 8b. The other ends of the elastic members 7a to 7d are attached to a printed circuit board 8c via a stationary member 9. Thus, the lens holder 2 is supported by the elastic members 7a to 7b so as to be fixed on the base 10.

The base 10 of this objective lens actuator is attached to an optical unit tray 13. Provided on the optical unit tray 13 are a light source (not shown) for emitting a light beam 12, and a reflection mirror 11 for deflecting the light beam 12 so as to be incident to the objective lens 1, in addition to the above-described objective lens actuator. Also provided on the optical unit tray 13 are component elements such as a circuit for detecting error signals to be used for the focusing control and tracking control and for detecting the information recorded on the disk 15 by receiving a light beam reflected by the disk 15.

The disk 15 is accommodated in a cartridge 14. An opening 14a through which the light beam 12 is radiated on the disk 15 is opened in the cartridge 14. The opening 14a has a length W in a direction perpendicular to both the focusing direction F and the tracking direction T (i.e. a direction in which the light beam 12 enters the reflection mirror 11).

In order to reduce the thickness of the entire optical information recording/reproducing apparatus, it is preferable that the objective lens actuator fits within the opening 14a of the cartridge 14. The reason is that the objective lens actuator is thicker than any other component element provided on the optical unit tray 13, so that a total thickness $H_3$ defined as a combination of the respective thicknesses of the objective lens actuator and the optical unit tray 13 (i.e. the distance from the lower face of the cartridge 14 to the lower face of the optical unit tray 13) is most critical to the thickness of the entire apparatus. However, there is a problem because the length W of the opening 14a is generally a small value, e.g. 17 mm in the case of an MD, so that it is difficult to fit the whole objective lens actuator within the opening 14a.

Accordingly, in a conventional optical information recording/reproducing apparatus, attempts are made to reduce the thicknesses of the objective lens actuator and the optical unit tray 13, for example, by configurating the lens holder 2 so as to project upward where it carries the objective lens 1, and by ensuring that the reflection mirror 11 can come inside a lower portion of the lens holder 2 under where the objective lens 1 is (i.e. so that the upper end of the reflection mirror 11 is located above the lowermost end of the lens holder 2), as shown in FIG. 23.

Correction of a focusing error or a tracking error is performed by moving the lens holder 2 carrying the objective lens 1 and the magnet 4b in the focusing direction F or the tracking direction T. Specifically, the actuation of the lens holder 2 along the focusing direction F is conducted by utilizing a driving force generated by an electrokinetic type transducer constituted by the focusing coil 5b, the magnetic yoke 3b, and the magnet 4b. On the other hand, the actuation of the lens holder 2 along the tracking direction T is conducted by utilizing a driving force generated by an electrokinetic type transducer constituted by the tracking coil 6b, the magnetic yoke 3b, and the magnet 4b. Since the lens holder 2 is supported by the four elastic members 7a to 7b disposed in parallel to one another, the lens holder 2 is always moved in parallel to the direction of the driving force.

However, the objective lens actuator of the configuration shown in FIG. 23 has a problem in that the stability of the servo controls, i.e. the focusing control and tracking control, may decrease. This is because the center of mass of a movable portion, which is composed essentially of the objective lens 1, the lens holder 2, the magnet 4b, and the printed circuit boards 8a and 8b, is at an offset with the driving force generated by the electrokinetic type transducer, possibly causing turbulence in the displacement-frequency characteristics. As shown in FIG. 25, one method to solve this problem is to dispose the electrokinetic type transducers on both sides of the lens holder 2 (along the direction in which the light beam 12 enters the reflection mirror 11) in such a manner that a middle point between the driving forces generated by the respective electrokinetic type transducers coincides with the center of mass of the movable portion, so that stable frequency characteristics can be obtained. However, according to the configuration shown in FIG. 25, it is impossible to allow the reflection mirror 11 to be inside the lower portion of the lens holder 2 (i.e. under the objective lens 1) in the same manner as shown in FIG. 23 because the reflection mirror 11, if situated inside the lower portion of the lens holder 2, would result in the light beam 12 being partially interrupted by the magnetic yoke 3a and the driving coils 5a and 6a. Therefore, the thickness of the objective lens actuator of the configuration shown in FIG. 25 cannot be reduced.

Moreover, in cases where an optical information recording/reproducing apparatus incorporating the above-mentioned objective lens actuator is employed as a portable device, there is a possibility for the disk to be accessed in a state where the tracking direction T is closer to or coincides with the direction of gravity. In such cases, the movable portion of the objective lens actuator may deviate from a neutral position due to the mass thereof, since as access operation is generally designed to be conducted when no tracking control is performed. Accordingly, in order to maintain the accuracy of the tracking control, it is required to design the movable portion of the objective lens actuator so as to be capable of moving in a broad area, in view of the above-mentioned possible deviation thereof, and also to design the diameter of the light beam 12 so as to be large. This will naturally hinder the reduction in thickness of the objective lens actuator.

SUMMARY OF THE INVENTION

An optical information recording/reproducing apparatus for optically writing and reproducing information on a disk-shape recording medium according to the present invention comprises: a base; an objective lens for converging a light beam on the disk-shape recording medium, an optical axis of the objective lens being perpendicular to the disk-shape recording medium; an actuator for actuating the objective lens along an optical axis direction in which the optical axis of the objective lens extends and along a radial direction of the disk-shape recording medium, wherein the actuator is fixed on the base and includes supporting means for supporting the objective lens, and a first electrokinetic type transducing means and a second electrokinetic type transducing means for driving the supporting means along the optical axis direction and/or the radial direction of the disk-shape recording medium, the first and second electrokinetic type transducing means interposing the supporting means, and a distance between the first electrokinetic type transducing means and the base being different from a distance between the second electrokinetic type transducing means and the base; and an optical member for directing the light beam traveling between the first electrokinetic type transducing means and the base to be incident to the objective lens.

In one embodiment of the invention, the distance between the first electrokinetic type transducing means and the base is larger than the distance between the second electrokinetic type transducing means and the base.

In another embodiment of the invention, each of the first and second electrokinetic type transducing means includes a magnet, a magnet yoke, and a plurality of driving coils disposed in a magnetic field generated by the magnet and the magnetic yoke.

In still another embodiment of the invention, the magnet is provided on the supporting means; the magnetic yoke is fixed on the base; and a first driving force generated by the first electrokinetic type transducing means and a second driving force generated by the second electrokinetic type transducing means are in symmetrical positions with respect to a center of mass of a movable portion including the objective lens, the supporting means, and the magnet.

In still another embodiment of the invention, the plurality of driving coils are provided on the supporting means; the magnetic yoke is fixed on the base; and a first driving force generated by the first electrokinetic type transducing means and a second driving force generated by the second electrokinetic type transducing means are in symmetrical positions with respect to a center of mass of a movable portion including the objective lens, the supporting means, and the plurality of driving coils.

In still another embodiment of the invention, the actuator further includes a stationary member fixed on the base, and a plurality of elastic members for supporting the supporting means, and wherein the plurality of elastic members are disposed substantially in parallel to one another and each include a first end attached to the supporting means and a second end attached to the stationary member.

In still another embodiment of the invention, the plurality of elastic members consist of four elastic members, and a spring constant of each of two of the four elastic members that are disposed closer to the disk-shape recording medium is different from a spring constant of each of the other two of the four elastic members.

In still another embodiment of the invention, each of the first ends of the plurality of elastic members is disposed closer to the disk-shape recording medium than is a corresponding one of the second ends of the plurality of elastic members.

In still another embodiment of the invention, the magnet included by the first electrokinetic type transducing means and the magnet included by the second electrokinetic type transducing means are disposed in such a manner that different poles thereof oppose each other.

In still another embodiment of the invention, the magnet included by the first electrokinetic type transducing means is shorter along the optical axis direction than the magnet included by the second electrokinetic type transducing means is along the optical axis direction.

In still another embodiment of the invention, the supporting means includes a magnetic member interposed between the magnet included by the first electrokinetic type transducing means and the magnet included by the second electrokinetic type transducing means.

In still another embodiment of the invention, the supporting means has an aperture for narrowing the light beam entering the objective lens so as to have a certain diameter, the aperture being a part of the magnetic member.

In still another embodiment of the invention, the plurality of driving coils include an optical-axis-direction driving coil for actuating the objective lens along the optical axis direction and a radial-direction driving coil for actuating the objective lens along the radius direction of the disk-shape recording medium.

In still another embodiment of the invention, the radial-direction driving coil is composed of split halves split along the radial direction, the split halves being wound around the magnetic yoke.

In still another embodiment of the invention, the supporting means includes a substrate to which the first ends of the plurality of elastic members are attached, and the stationary member includes a substrate to which the second ends of the plurality of elastic members are attached.

In still another embodiment of the invention, the substrates are printed circuit boards; the plurality of elastic members are metal rods; and the first and the second ends of the plurality of elastic members are soldered to the printed circuit boards.

In still another embodiment of the invention, wherein the substrates are metal plates; the plurality of elastic members are metal rods; and the first and the second ends of the plurality of elastic members are soldered to the printed circuit boards.

In still another embodiment of the invention, the supporting means includes a concave or convex portion for positioning the magnet with respect to the supporting means.

In still another embodiment of the invention, each of the elastic members has a cross section having a predetermined thickness and a predetermined width, the predetermined thickness being different from the predetermined width.

In still another embodiment of the invention, at least one of the first and second ends of the plurality of elastic members are bent.

In still another embodiment of the invention, the plurality of elastic members are plate springs each having an L-shape.

In still another embodiment of the invention, the stationary member includes at least one groove for positioning the second ends of the plurality of elastic members.

In still another embodiment of the invention, the stationary member includes a substrate to which the second ends of the plurality of elastic members are attached, and the at least one groove is formed in the substrate.

In still another embodiment of the invention, at least one groove is tapered.

In still another embodiment of the invention, the substrate is insert molded onto the supporting means and the stationary member.

In still another embodiment of the invention, the stationary member includes at least one concave portion for accommodating the plurality of elastic members, a viscoelastic material which cures when irradiated with a UV-ray being filled in the at least one concave portion.

In still another embodiment of the invention, at least one concave portion of the stationary member is tapered.

In still another embodiment of the invention, at least one notch is formed in the base in a vicinity of the stationary member.

In still another embodiment of the invention, the plurality of elastic members have a general rod shape, and substantially conical holes for positioning the first ends of the plurality of elastic members are formed in the supporting means.

In still another embodiment of the invention, the plurality of elastic members have a general rod shape, and substantially conical holes for positioning the second ends of the plurality of elastic members are formed in the stationary member.

In still another embodiment of the invention, the plurality of elastic members have a general rod shape, and substantially cylindrical holes for positioning the first ends of the plurality of elastic members are formed in the supporting means, a center axis of each of the cylindrical holes is at an angle with a direction in which the plurality of elastic members extend.

In still another embodiment of the invention, each of the second ends of the plurality of elastic members has a diameter larger than other portions of each of the plurality of elastic members.

In still another embodiment of the invention, the supporting means is composed essentially of a liquid crystal polymer.

In still another embodiment of the invention, the supporting means further includes an adhesive receiving portion into which an adhesive for bonding the objective lens to the supporting means is filled.

Thus, in an optical information recording/reproducing apparatus according to the present invention, first and second electrokinetic type transducers are provided on both sides of supporting means carrying an objective lens. These electrokinetic type transducers generate driving forces on both sides of the supporting means, a middle point between the driving forces coinciding with the center of mass of a movable portion constituted by the objective lens, the supporting means, and the like. As a result, the displacement-frequency characteristics are prevented from deteriorating, whereby stable servo controls can be realized. Moreover, the first electrokinetic type transducer is preferably disposed so as to be more distant from a base than is the second electrokinetic type transducer. As a result, a light beam, traveling between the first electrokinetic type transducer and the base, enters the objective lens without being interrupted. Thus, according to the present invention, there is provided an optical information recording/reproducing apparatus incorporating an objective lens actuator which is thinner than a conventional objective lens actuator having a plurality of electrokinetic type transducers.

Moreover, members each having a generally flat cross section whose width is larger than the thickness thereof are used as elastic members for fixing the supporting means to a stationary member attached to the base. The thickness of a cross section of each elastic member is defined as the width of the elastic member along the focusing direction; the width of a cross section of each elastic member is defined as the width of the elastic member along the tracking direction. As a result, any displacement of the movable portion along the tracking direction due to the mass thereof is restrained even when the recording medium is accessed in a state where the tracking direction is closer to or coincides with the direction of gravity. Therefore, it is not necessary to design the movable portion of the objective lens actuator so that it is be capable of moving in an excessively broad area in view of the possible displacement thereof along the tracking direction. Neither is it necessary to prescribe the diameter of the light beam to be excessively large in view of possible partial interruption thereof. As a result, the thickness of the objective lens actuator can be reduced.

Thus, the invention described herein makes possible the advantage of providing an optical information recording/reproducing apparatus incorporating an objective lens actuator in which the total thickness of an optical unit tray and the objective lens actuator can be reduced and which has stable displacement-frequency characteristics.

This and other advantages of the present invention will become apparent to those skilled in the art upon reading and

DESCRIPTION OF THE PREFERRED EMBODIMENTS

Hereinafter, an objective lens actuator of the optical information recording/reproducing apparatus according to the present invention will be described by way of examples, with reference to the accompanying drawings. Like component elements are indicated by like numerals throughout the accompanied drawings.

EXAMPLE 1

Figure 1:
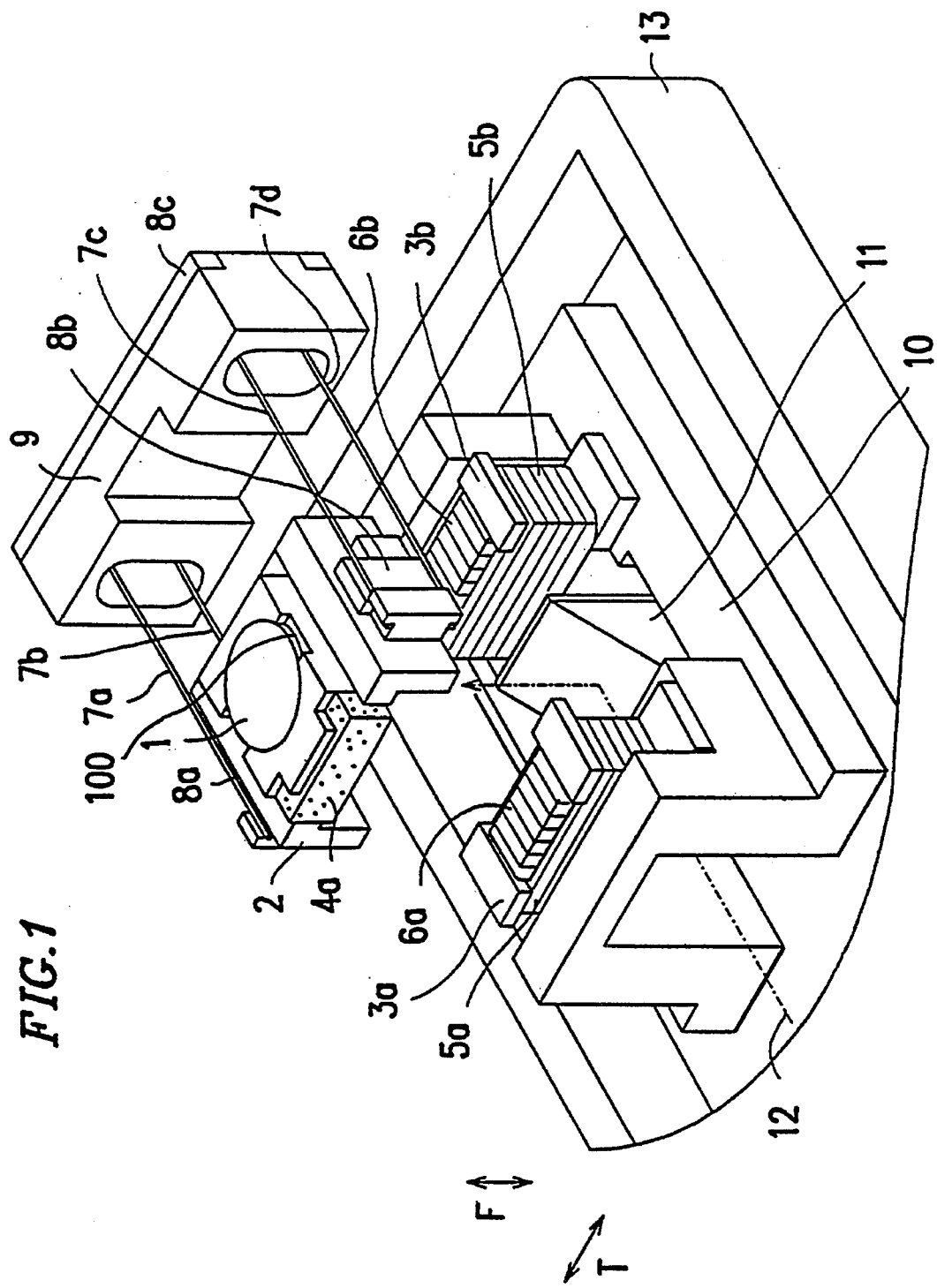
FIG. 1 is a perspective view showing a configuration for an objective lens actuator according to a first example of the present invention.
Figure 2:
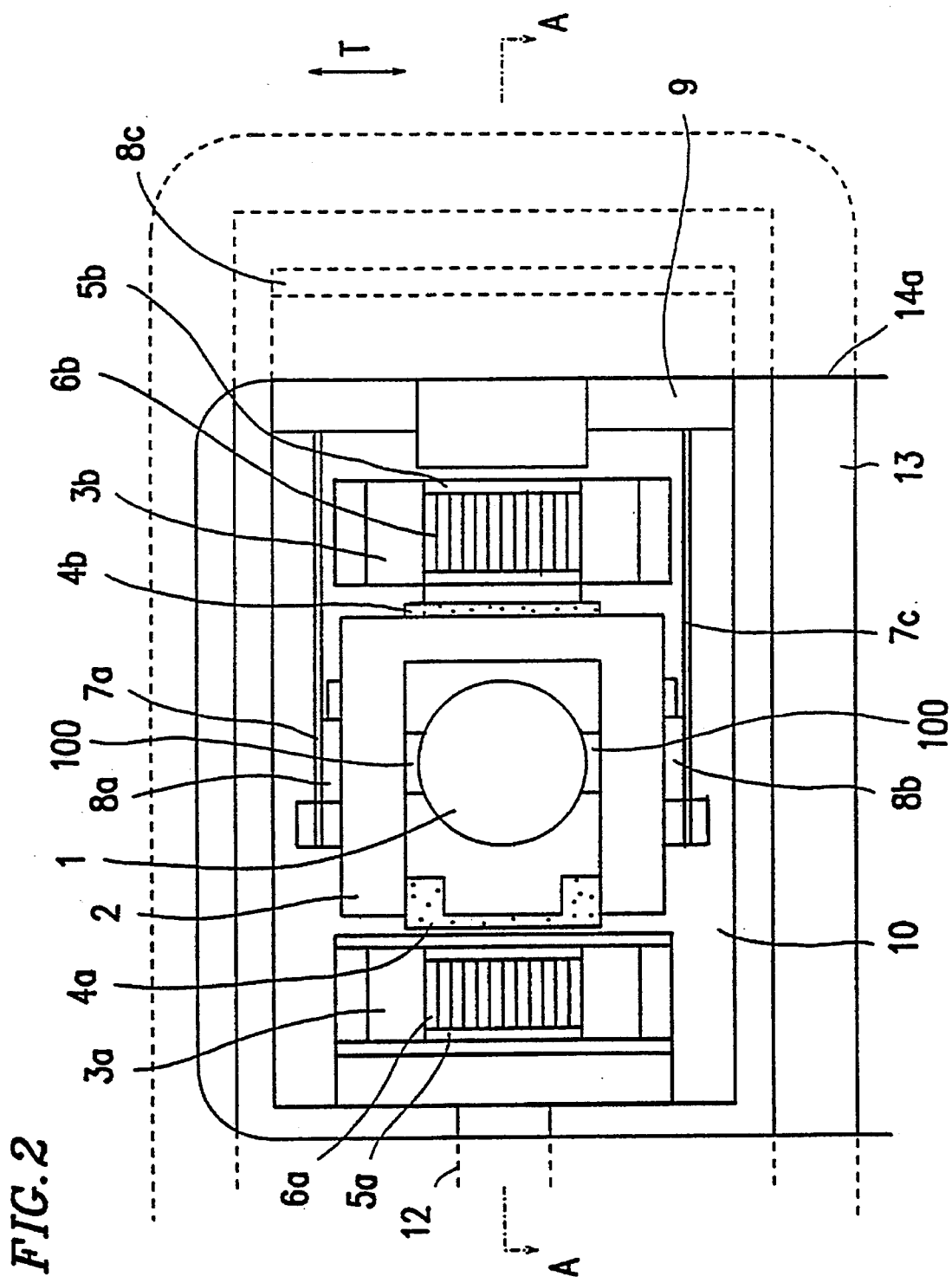
FIG. 2 is a plan view showing relative positions of the objective lens actuator shown in FIG. 1 and a cartridge.
Figure 3:
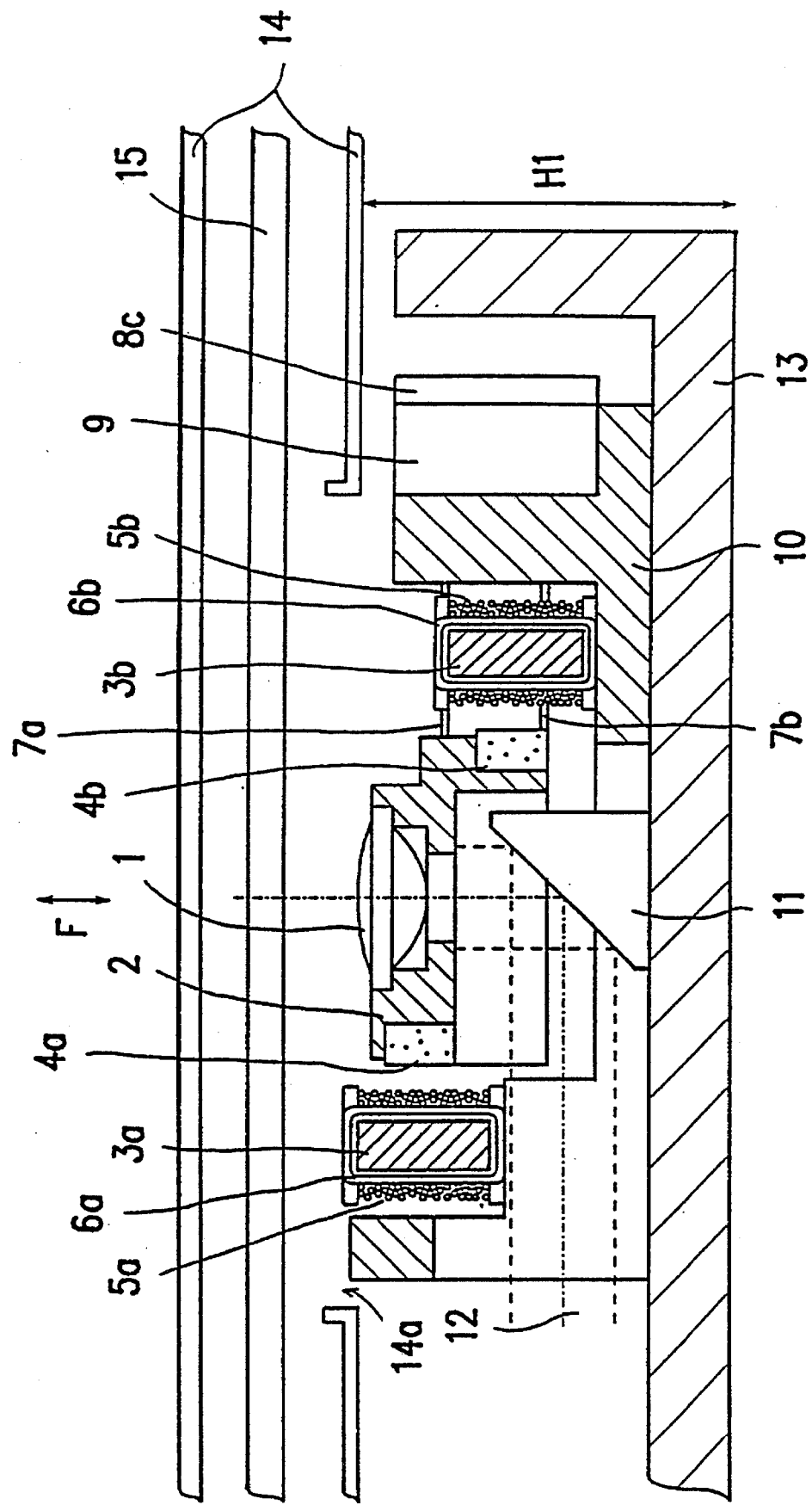
FIG. 3 is a cross-sectional view showing the objective lens actuator shown in FIG. 1, taken along line A—A in FIG. 2.

FIG. 1 is an exploded perspective view showing an objective lens actuator according to a first example of the present invention. FIG. 2 is a plan view showing relative positions of the objective lens actuator and an opening 14a of a cartridge 14 shown in FIG. 1. FIG. 3 is a cross-sectional view showing the objective lens actuator of FIG. 1, taken along line A—A in FIG. 2. As shown in FIG. 3, an objective lens 1 is supported by a lens holder 2 so as to be perpendicular to the surface of a disk 15. In other words, the optical axis of the objective lens 1 is made parallel to a focusing direction F.

On the upper face of the lens holder 2, an adhesive receiving portion 100 is formed, into which an adhesive for fixing the objective lens 1 on the lens holder 2 is filled. The lens holder 2 is formed so as to project towards the disk 15 where it carries the objective lens 1. The lens holder 2 may be composed of a liquid crystal polymer such as Vectra (commercially available from POLYPLASTICS CO., LTD.). By injection molding the lens holder 2 using such a liquid crystal polymer, displacement-frequency characteristics in higher frequency bands can be attained.

As shown in FIGS. 1 and 2, printed circuit boards 8a and 8b are provided on the respective side faces of the lens holder 2, so as to interpose the lens holder 2 along a tracking direction T. One end of each of elastic members 7a and 7b is attached to the printed circuit board 8a. One end of each of elastic members 7c and 7d is attached to the printed circuit board 8b. The elastic members 7a to 7d are disposed substantially in parallel to one another. The other end of each elastic member 7a to 7d is attached to a stationary member 9 fixed on a base 10. Thus, the lens holder 2 is supported by the elastic members 7a to 7d.

The base 10 of the objective lens actuator is fixed on an optical unit tray 13. On the optical unit tray 13, a light source (not shown), e.g. a semiconductor laser, for emitting a light beam 12 and a reflection mirror 11 for deflecting the light beam 12 so as to be incident to the objective lens 1 are provided, in addition to the above-described objective lens actuator. Also on the optical unit tray 13 is provided a circuit for receiving the light beam 12 reflected form the disk 15 so as to detect signals for servo controls, i.e. a focusing error signal and a tracking error signal, and signals representing information recorded on the disk 15.

The light beam 12, emitted from the light source not shown, enters the reflection mirror 11 via an optical system (not shown), and is deflected by the reflection mirror 11 so as to be incident to the objective lens 1. The light beam 12 incident to the objective lens 1 is led through the opening 14a of the cartridge 14 so as to converge on the disk 15. As a result, the information recorded on the disk 15 can be optically read; and information can be optically written on the disk 15. Subsequently, the light beam 12 is reflected from the disk 15, and is led through the objective lens 1 and the reflection mirror 11 in this order, so as to be incident to the circuit (not shown) for detecting servo signals and information signals based on the light beam 12. Thus, recording/ reproduction of information is conducted for the disk 15. As will be appreciated, the recording/reproduction of information is conducted by a known technique and is not the subject matter of the present invention; therefore, description thereof is omitted from the present specification.

In accordance with the objective lens actuator of the present invention, the lens holder 2 projects towards the disk 15 where it carries the objective lens 1. (Hereinafter, this portion of the lens holder 2 carrying the objective lens 1 will be referred to as the 'projection portion'). Moreover, the reflection mirror 11 is allowed to be under the projection portion of and into the lens holder 2. That is, the reflection mirror 11 is disposed in such a manner that the upper end thereof is closer to the disk 15 than the lowermost end of the lens holder 2. Magnets 4a and 4b are provided on the respective side faces of the lens holder 2. Specifically, the magnet 4a is disposed on the side of the projection portion of the lens holder 2 where the light beam 12 enters the reflection mirror 11 (i.e. the left side of the lens holder 2 as shown in FIGS. 2 and 3). The magnet 4b is disposed on the other side of the lens holder 2 along a direction perpendicular to both the focusing direction F and the tracking direction T (i.e. the right side of the lens holder 2 as shown in FIGS. 2 and 3). As a result, the magnets 4a and 4b are disposed at different positions along the focusing direction F.

In the present example, magnets of the same material and the same size are used as the magnets 4a and 4b. The magnets 4a and 4b are disposed in such a way that different poles thereof oppose each other. For example, if the pole of the magnet 4a which is nearer the objective lens 1 is an north pole, the magnet 4b is disposed with the south pole thereof being nearer the objective lens 1.

In positions opposing the magnets 4a and 4b, respectively, a magnetic yoke 3a and a magnetic yoke 3b are provided. A focusing coil 5a and a tracking coil 6a are wound around the magnetic yoke 3a. A focusing coil 5b and a tracking coil 6b are wound around the magnetic yoke 3b. The magnetic yokes 3a and 3b are fixed on the base 10. The base 10 extends beyond the reflection mirror 11. On the end of the base 10 opposite the stationary member 9 (with respect to the reflection mirror 11), a U-shape opening which surrounds an optical path for the light beam 12 entering the reflection mirror 11 is formed. On the respective sides of the base 10 (with respect to the optical path for the light beam 12), thick portions are formed, both of which carry the magnetic yoke 3a. The thickness of each thick portion is determined to be large enough not to allow the magnetic yoke 3a to obstruct the optical path for the light beam 12.

Thus, according to the present invention, electrokinetic type transducers composed essentially of magnetic yokes 3a and 3b, the driving coils (i.e. the focusing coils 5a and 5b and the tracking coils 6a and 6b), and the magnets 4a and 4b are provided on the respective sides of the lens holder 2 (along the direction perpendicular to both the focusing direction F and the tracking direction T) and in different positions along the focusing direction F, so that the electrokinetic type transducers may not obstruct the optical path for the light beam 12. As a result, driving forces are generated on both sides of the lens holder 2. A middle point between these driving forces is ensured to coincide with the center of mass of a movable portion composed essentially of the objective lens 1, the lens holder 2, the printed circuit boards 8a and 8b, and the magnets 4a and 4b. Specifically, the lens holder 2 may be so designed that the center of mass of the movable portion is located in a middle point of an imaginary line between the respective centers of the magnets 4a and 4b, for example. If the center of mass of the movable portion still does not coincide with the middle point between the driving forces generated on both sides of the lens holder 2, the center of mass of the movable portion may be lowered by increasing the mass of the lens holder 2, so that the center of mass of the movable portion coincides with the middle point between the driving forces.

Figure 23:
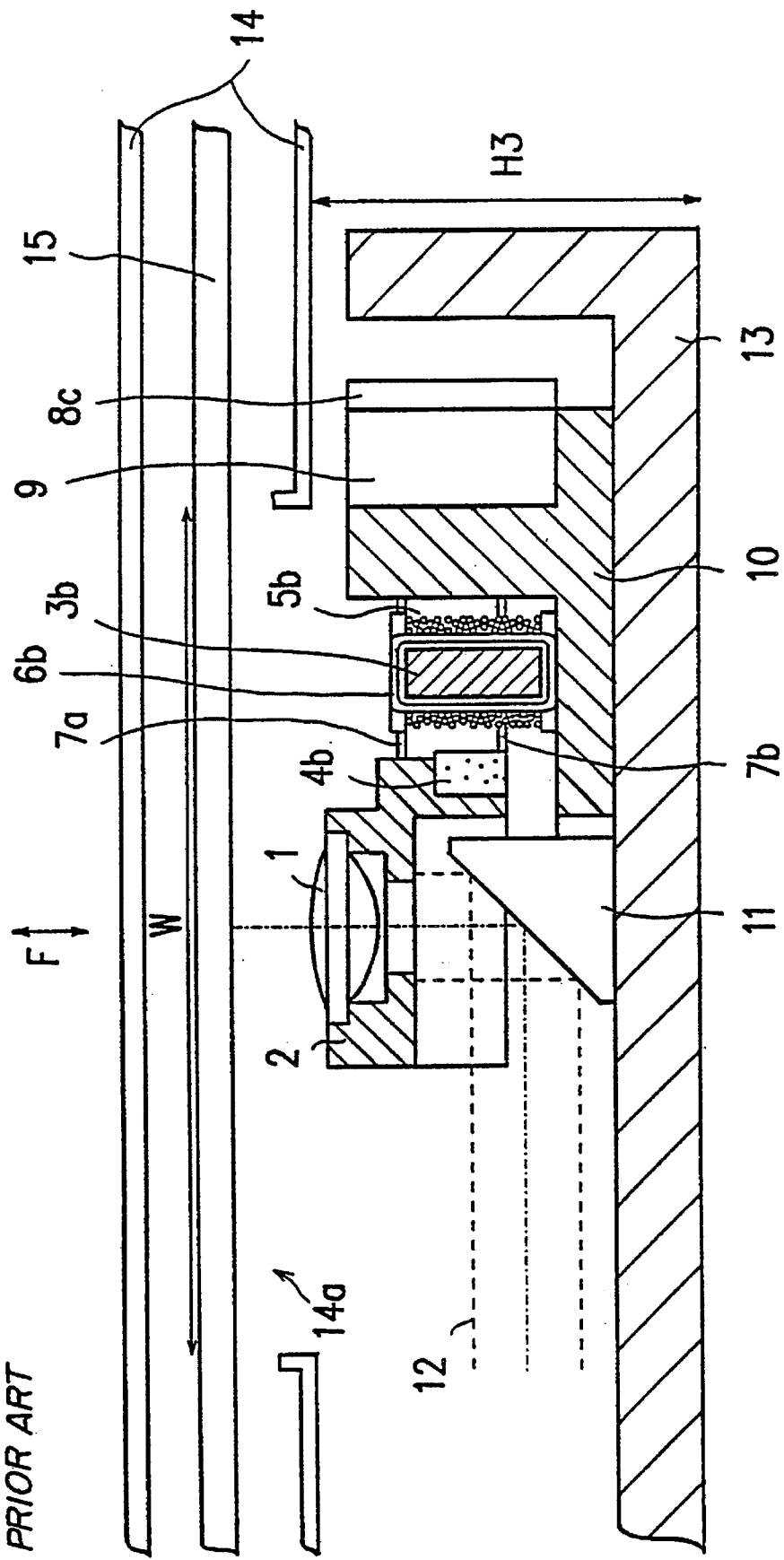
FIG. 23 is a front view showing a configuration for a conventional objective lens actuator and the relative positions of the objective lens actuator and a cartridge.
Figure 24:
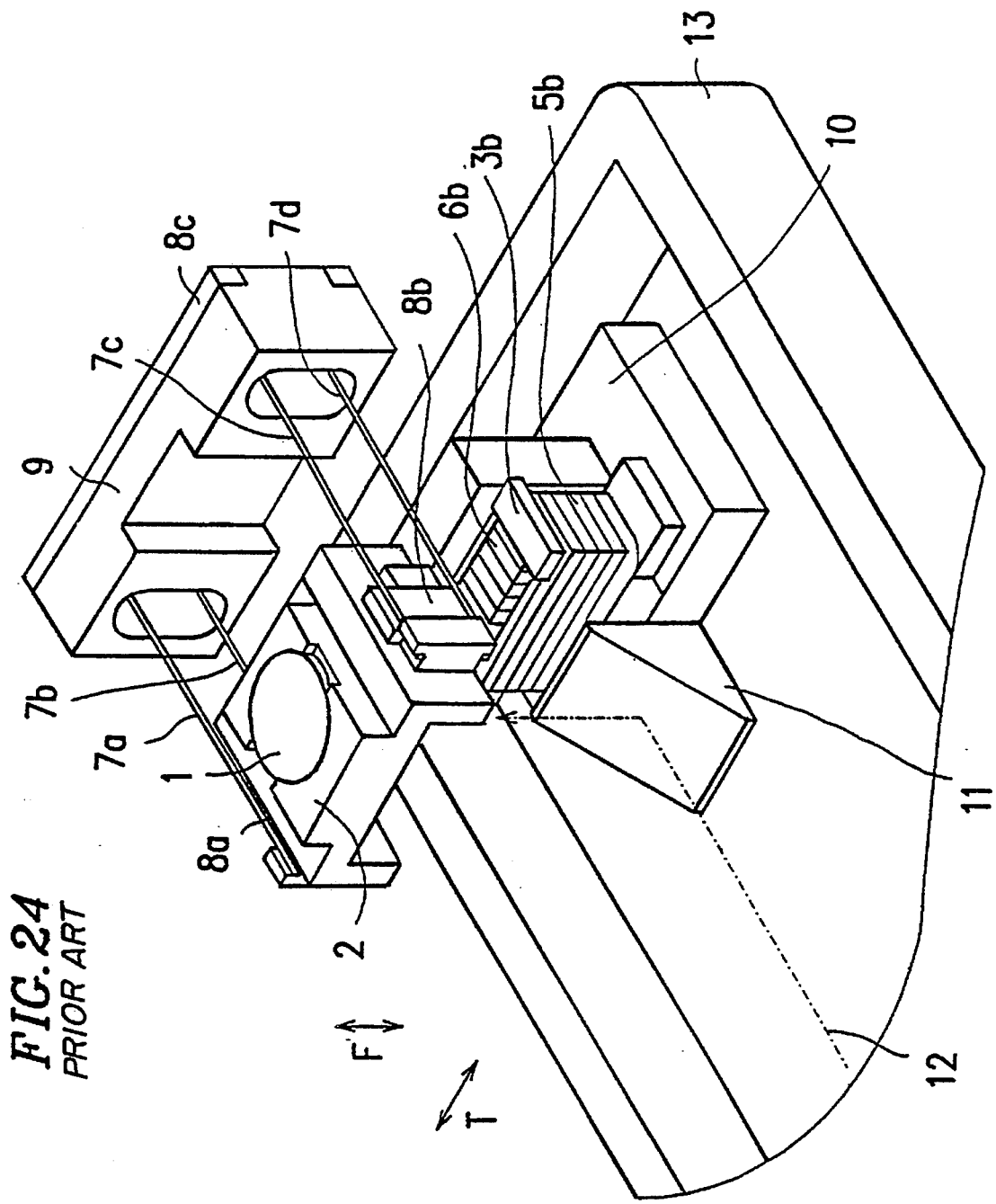
FIG. 24 is an exploded perspective view showing a configuration for a conventional objective lens actuator.
Figure 25:
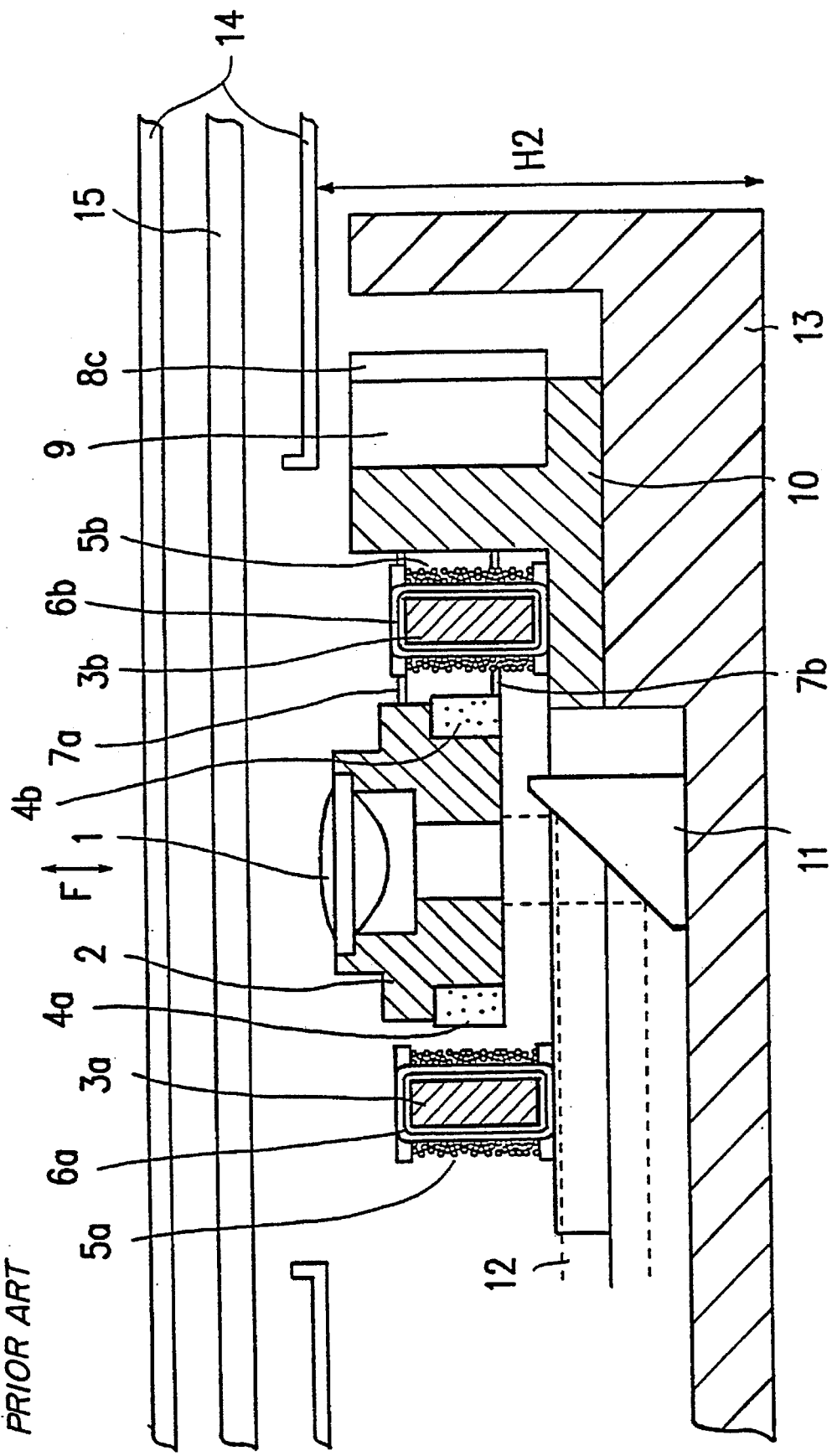
FIG. 25 is a front view showing a configuration for a conventional objective lens actuator and the relative positions of the objective lens actuator and a cartridge.

In accordance with the objective lens actuator of the present example, as well as the conventional objective lens actuator shown in FIG. 23, correction of a focusing error or a tracking error is performed by moving the lens holder 2 along the focusing direction F or the tracking direction T. However, unlike the conventional objective lens actuator shown in FIG. 23, the two electrokinetic type transducers according to the present example are provided on both sides of the lens holder 2 in such a way that the center of mass of the movable portion coincides with the middle point between the driving forces generated thereby. Therefore, the objective lens actuator of the present example can attain stable displacement-frequency characteristics and stable servo controls. Moreover, the two electrokinetic type transduces are located in different positions along the focusing direction F in such a way that the electrokinetic type transducer formed nearer the U-shape opening of the base 10 is disposed closer to the disk 15 than is the other electrokinetic type transducer. This makes it possible to allow a total thickness $H_1$ of the optical unit tray 13 and the objective lens actuator (i.e. the distance from the lower face of the cartridge 14 to the lower face of the optical unit tray 13) to be substantially identical with the thickness $H_3$ shown in FIG. 23, in which only one electrokinetic type transducer is provided in order to reduce the thickness of the entire apparatus.

However, even if the middle point between the driving forces generated by the electrokinetic type transducers coincides with the center of mass of the movable portion, the movable portion may be tilted owing to a moment generated when the movable portion is actuated, unless the middle point between the driving forces also coincides with the center of support of the elastic members 7a to 7d created on the lens holder 2 side. For example, if the center of support of the elastic members 7a to 7d on the lens holder 2 side is offset with the middle point between the driving forces along the focusing direction F, a moment is generated when the movable portion is actuated in the tracking direction T, thereby tilting the movable portion and possibly deteriorating the optical performance of the apparatus. In such cases, it is necessary to ensure that the middle point between the driving forces coincides with the center of support of the elastic members 7a to 7d.

One method to ensure that the middle point between the driving forces coincides with the center of support of the elastic members 7a to 7d is to change the relative relationship between the spring constants of the elastic members 7a to 7d. If the center of support of the elastic members 7a to 7d is offset with the middle point between the driving forces along the focusing direction F, the relative relationship between the spring constants of the elastic members 7a and 7b, and the relative relationship between the spring constants of the elastic members 7c and 7d are optimized. For example, if the middle point between the driving forces is deviated so as to be closer to the disk 15 than is the center of support of the elastic members 7a to 7d, the spring constants of the elastic members 7a and 7c are made larger than those of the elastic members 7b and 7d. By thus adjusting the spring constants of the elastic members 7a to 7d, the tilt of the movable portion when actuated can be canceled, thereby stabilizing the optical performance of the apparatus.

Figure 4:
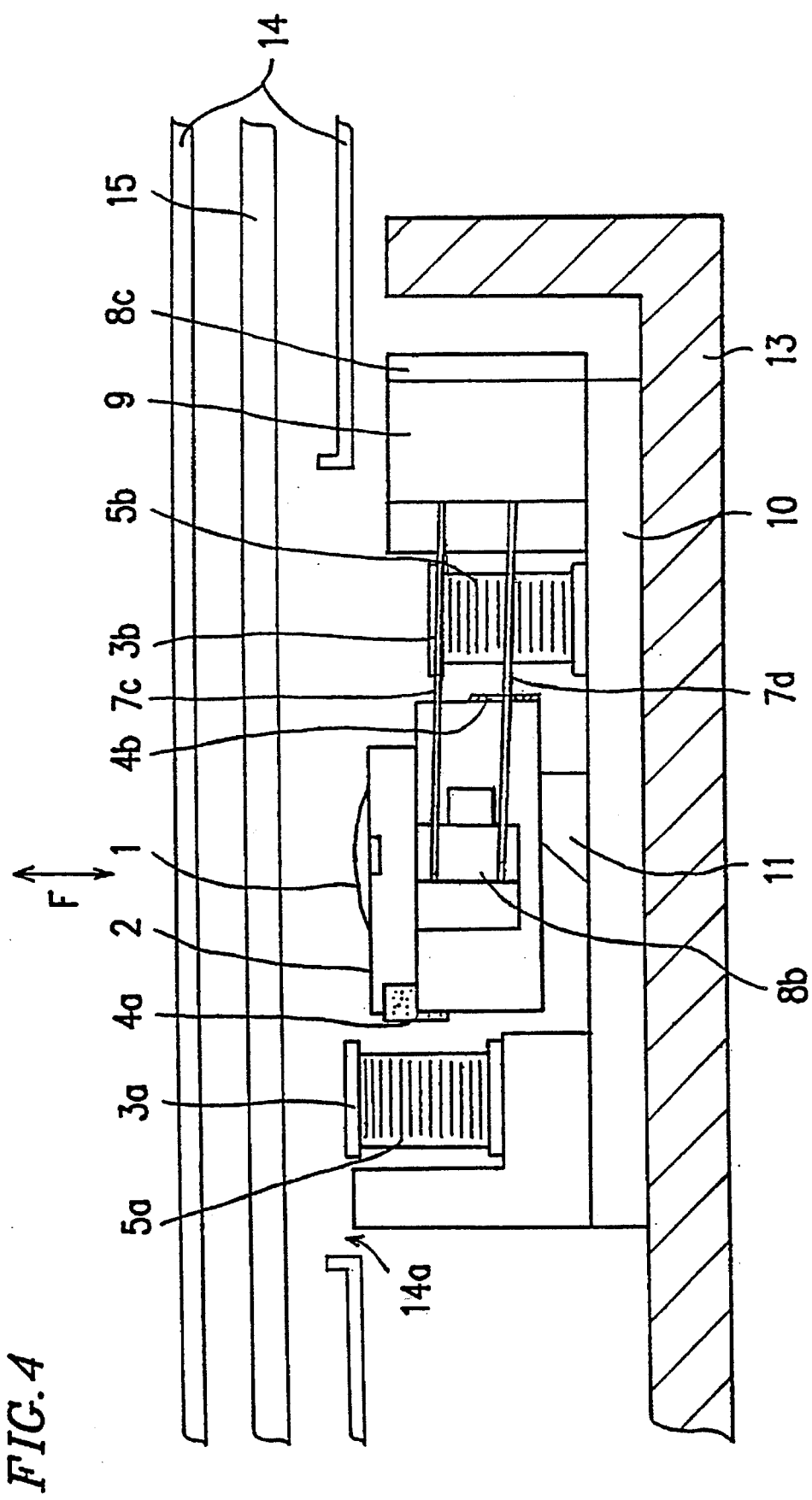
FIG. 4 is a view showing the relationship between the center of mass of a movable portion of the objective lens actuator and the center of support for the objective lens actuator according to a first example of the present invention.

Alternatively, as shown in FIG. 4, the adjustment of the center of support of the elastic members 7a to 7d can be realized by disposing the ends of the elastic members 7a to 7d that are attached to the lens holder 2 closer to the disk 15 than are the ends of the elastic members 7a to 7d attached to the stationary member 9. Since this method amounts to merely adjusting the positions in which the elastic members 7a to 7d are attached to the lens holder 2, the center of support of the elastic members 7a to 7d can be made to coincide with the center of mass of the movable portion without increasing the thickness of the entire apparatus.

Thus, according to the present invention, the middle point between the driving forces, the center of mass of the movable portion defined by the objective lens 1, the lens holder 2, the printed circuit boards 8a and 8b, and the magnets 4a and 4b, and the center of support of the elastic members 7a to 7d can be easily made identical with one another, without increasing the total thickness of the objective lens actuator and the optical unit tray 13, by adjusting the spring constants of the elastic members 7a to 7d and/or the attachment positions thereof with respect to the lens holder 2. Therefore, the optical performance of the apparatus is prevented from deterioration due to a tilt of the movable portion generated when the movable portion is actuated.

Figure 5:
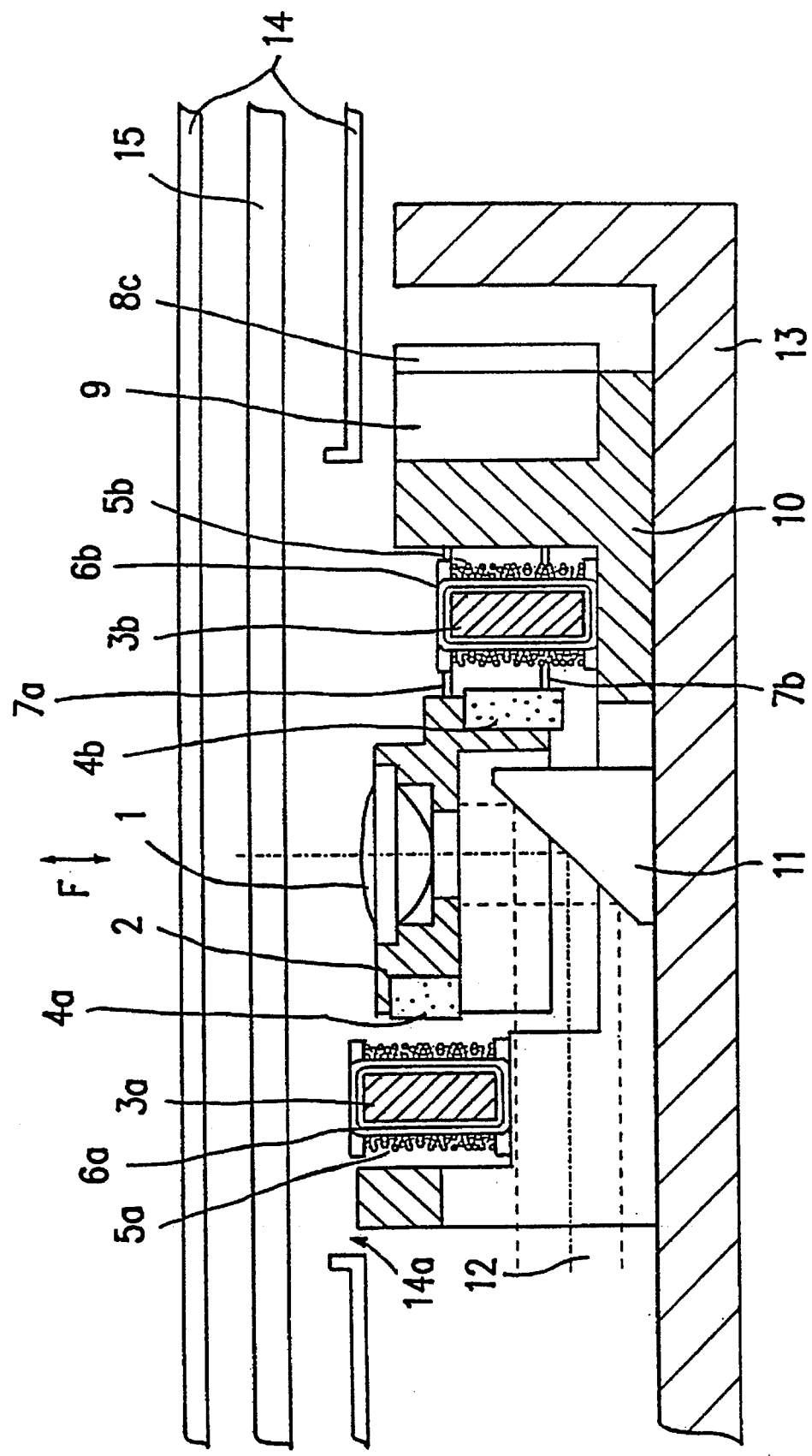
FIG. 5 is a view showing a variant of the objective lens actuator according to the present invention.

In the present example, the magnets 4a and 4b are disposed in such a way that different poles thereof oppose each other. As a result, the magnetic field generated by the magnet 4a is effectively prevented from having substantial influence on the disk 15 although the magnet 4a disposed closer to the disk 15 than is the magnet 4b. The same effect can be enhanced by increasing the intensity of the magnetic field generated by the further magnet 4b from the disk 15 than that of the closer magnet 4a so that the magnetic fluxes generated by the magnets 4a and 4b substantially cancel each other in the vicinity of the recording surface of the disk 15. An instance of this is shown in FIG. 5, in which the size of the magnet 4b is increased relative to that of the magnet 4a. If the magnets 4a and 4b are composed of the same material, the magnetic field generated by the magnet 4b can be made more intense than that generated by the magnet 4a by simply increasing the size of the magnet 4b. As a result, the magnetic fluxes generated by the magnets 4a and 4b cancel each other in the vicinity of the recording surface of the disk 15, so that the magnetic charge in a region of the surface of the disk 15 that is irradiated with the light beam 12 becomes free from the influence of the magnets 4a and 4b.

Although the magnets 4a and 4b are composed of the same material in the example shown in FIG. 5, it will be appreciated that, in cases where magnets of different materials are used, the same effect can be obtained by using the magnet capable of generating a more intense magnetic field as the further magnetic 4b.

Figure 6:
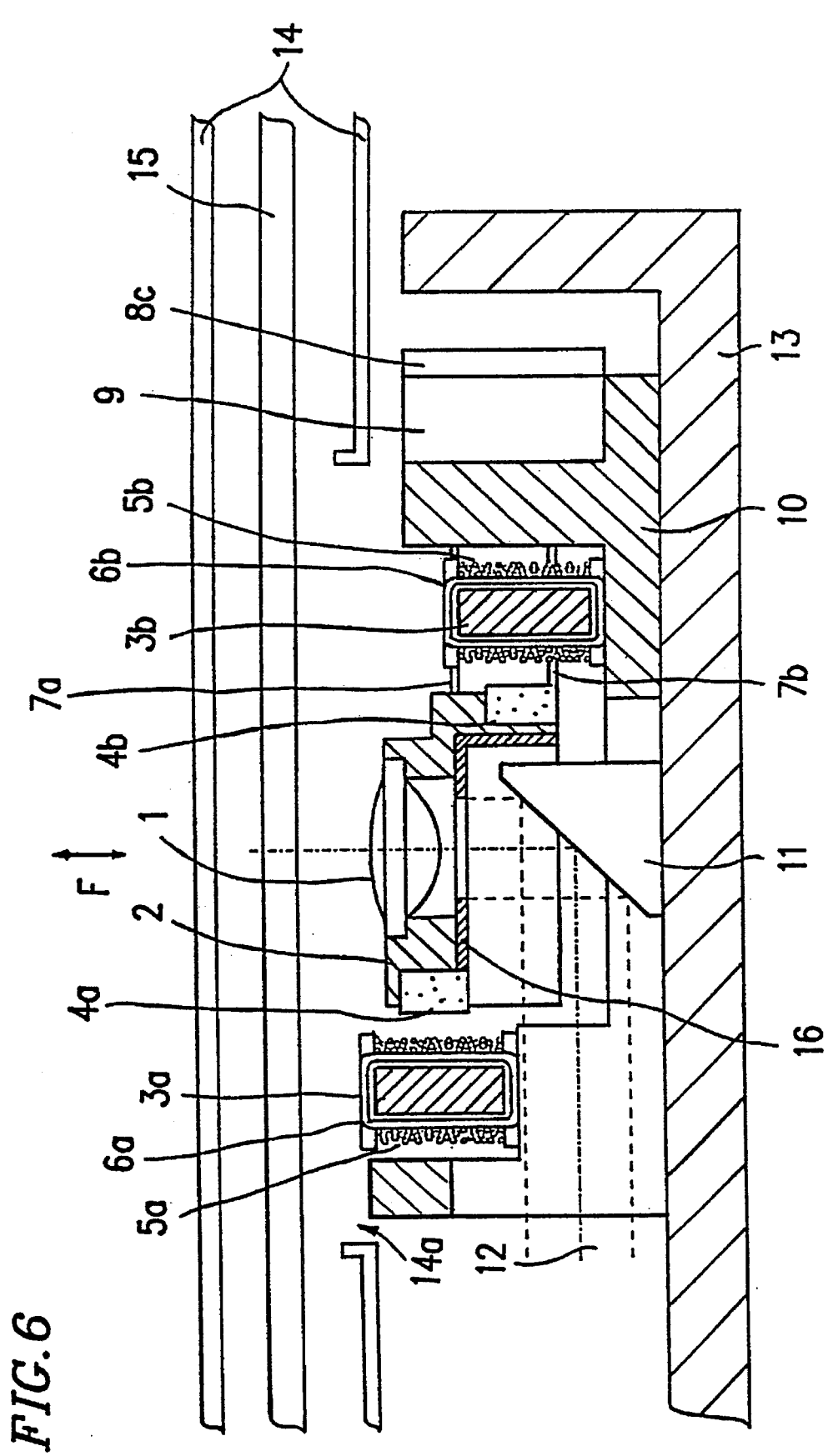
FIG. 6 is a view showing another variant of the objective lens actuator according to the present invention.

Alternatively, as shown in FIG. 6, the influence of the magnets 4a and 4b on the disk 15 can be reduced by disposing a magnetic member 16 in a portion of the lens holder 2 interposed between the magnets 4a and 4b. The configuration of the magnetic member 16 is not limited to that which is shown in FIG. 6, but may be any configuration so long as the magnetic member 16 can reduce the influence of the magnetic fields generated by the magnets 4a and 4b without obstructing the optical path for the light beam 12 entering the objective lens 1 from the reflection mirror 11. The magnetic member shown in FIG. 6 also serves as an aperture for narrowing the diameter of the light beam entering the objective lens 1. In this case, it is made possible to narrow the diameter of the light beam with high precision, without providing a separate aperture in addition to the magnetic member 16. It is also applicable to, instead of employing the magnetic member 16 as an aperture, configurate a portion of the lens holder 2 so as to serve as an aperture, or to provide a separate aperture for the lens holder 2 besides the magnetic member 16. Moreover, the center of mass of the movable portion can be easily adjusted by varying the mass and/or configuration of the magnetic member 16.

As is described above, according to the present example, the electrokinetic type transducers are provided on both sides of the lens holder 2 in such a manner that the electrokinetic type transducer closer to the U-shape opening of the base 10 is also closer to the disk 15 than is the other electrokinetic type transducer. As a result, the thickness of the entire apparatus can be reduced without allowing the optical path for the light beam 12 to be obstructed, while securing stable displacement-frequency characteristics.

Hereinafter, further reduction of the total thickness of the objective lens actuator and the optical unit tray is considered.

Figure 7:
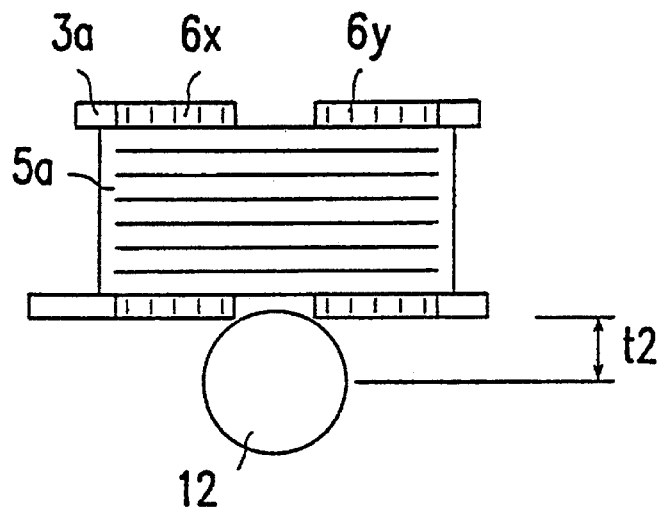
FIG. 7 is a view showing the relative positions of a light beam and a magnetic yoke in still another variant of the objective lens actuator according to the present invention.
Figure 8:
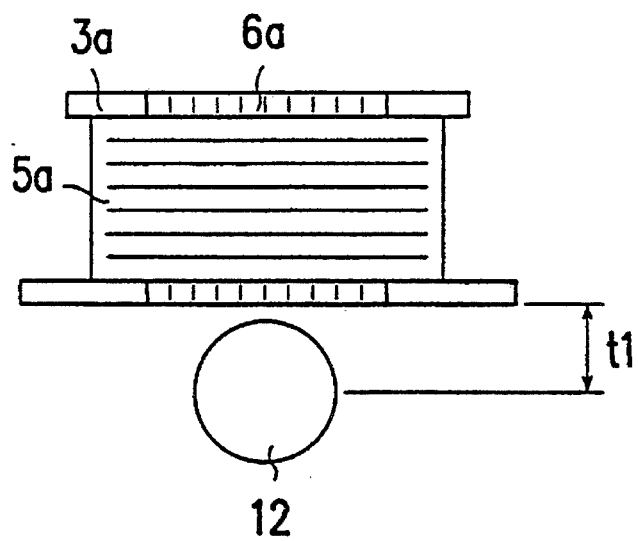
FIG. 8 is a view showing the relative positions of a light beam and a magnetic yoke in the objective lens actuator according to a first example of the present invention.

In the above-described first example of the invention, the magnetic yoke 3a, around which the focusing coil 5a and the tracking coil 6a are wound, is disposed above the light beam 12. Therefore, a predetermined distance $t_1$ must be secured between the center of the light beam 12 and the lower face of the magnetic yoke 3a, as shown in FIG. 8. However, if the objective lens actuator is of a magnet-driving type, as in the above example, which includes a magnet attached to a movable portion, a stationary magnetic yoke, and coils directly wound around the stationary magnetic yoke, the distance $t_1$ between the center of the light beam 12 and the lower face of the magnetic yoke 3a can be reduced to a distance $t_2$ by splitting the tracking coil 6a into coils 6x and 6y and winding the coils 6x and 6y around the magnetic yoke 3a in a split manner, i.e. with a space secured between the coils 6x and 6y, as shown in FIG. 7. In other words, by splitting the electrokinetic type transducer located above the light beam 12 into two transducers, namely, a transducer composed essentially of the magnet 4a, the focusing coil 5a, the tracking coil 6x, and the magnetic yoke 3a; and a transducer composed essentially of the magnet 4a, the focusing coil 5a, the tracking coil 6y and the magnetic yoke 3a, the total thickness of the objective lens actuator and the optical unit tray 13 can be further reduced.

Figure 9:
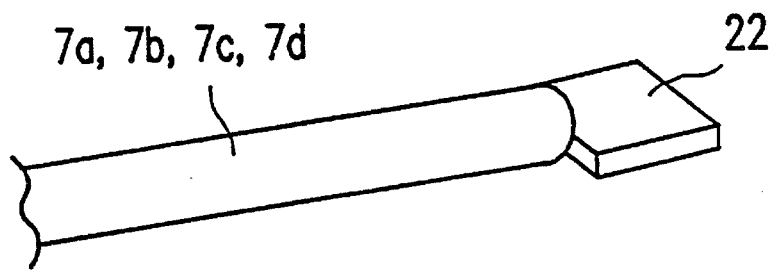
FIG. 9 is a perspective view showing an essential portion of an elastic member of the objective lens actuator according to a first example of the present invention.

In the above-described first example of the invention, rods composed of a copper alloy such as phosphor bronze are used for the elastic members 7a to 7d. FIG. 9 shows an exemplary configuration of the ends of the elastic members 7a to 7d attached to the stationary member 9. (Hereinafter, these ends of the elastic members will be referred to as the 'stationary-member-side ends'.) As seen from FIG. 9, the stationary-member-side end of each of the elastic members 7a to 7b is pressed so as to form a plate-like stopper portion 22. Such a stopper portion 22 has the following advantage: In the fabrication of the objective lens actuator, the elastic members 7a to 7d can simply be dropped through holes opened in the printed circuit board 8c with the stopper portions 22 up (in a state where the elastic members 7a to 7d extend in the direction of gravity), and the stopper portions 22 will be caught by the edges of the holes, so that the elastic members 7a to 7d can be properly positioned with respect to the printed circuit board 8c along a direction in which the elastic members 7a to 7d extend. Moreover, by forming the circuit boards 8a to 8c of metal plates composed of a copper alloy such as phosphor bronze, it becomes possible to fix the elastic members 7a to 7d on the printed circuit boards 8a to 8c by soldering, which can facilitate the assembly of the objective lens actuator. As a result, the fabrication steps of the optical information recording/reproducing apparatus can be simplified, and the reliability of the apparatus increases.

Furthermore, by insert molding the printed circuit boards 8a and 8b onto the lens holder 2, and the printed circuit board 8c onto the stationary member 9, respectively, the facility of assembly of the objective lens actuator further increases. The facility can be additionally increased by forming the lens holder 2 of a resin so as to have a projection and/or a groove formed thereon, the projection and/or groove being utilized for the positioning of the magnets 4a and 4b.

The present example and the variants thereof each relate to an objective lens actuator of a magnet-driving type, which generally includes a magnet attached to a movable portion, a stationary magnetic yoke, and a focusing coil and a tracking coil directly wound around the stationary magnetic yoke. However, the effects attained by the present example and the variants thereof can similarly apply to a coil-driving type objective lens actuator, which generally includes a movable portion carrying a focusing coil and a tracking coil, a stationary magnet, and a stationary magnetic yoke.

EXAMPLE 2

Hereinafter, an objective lens actuator for use in an optical information recording/reproducing apparatus according to a second example of the present invention will be described.

Figure 10:
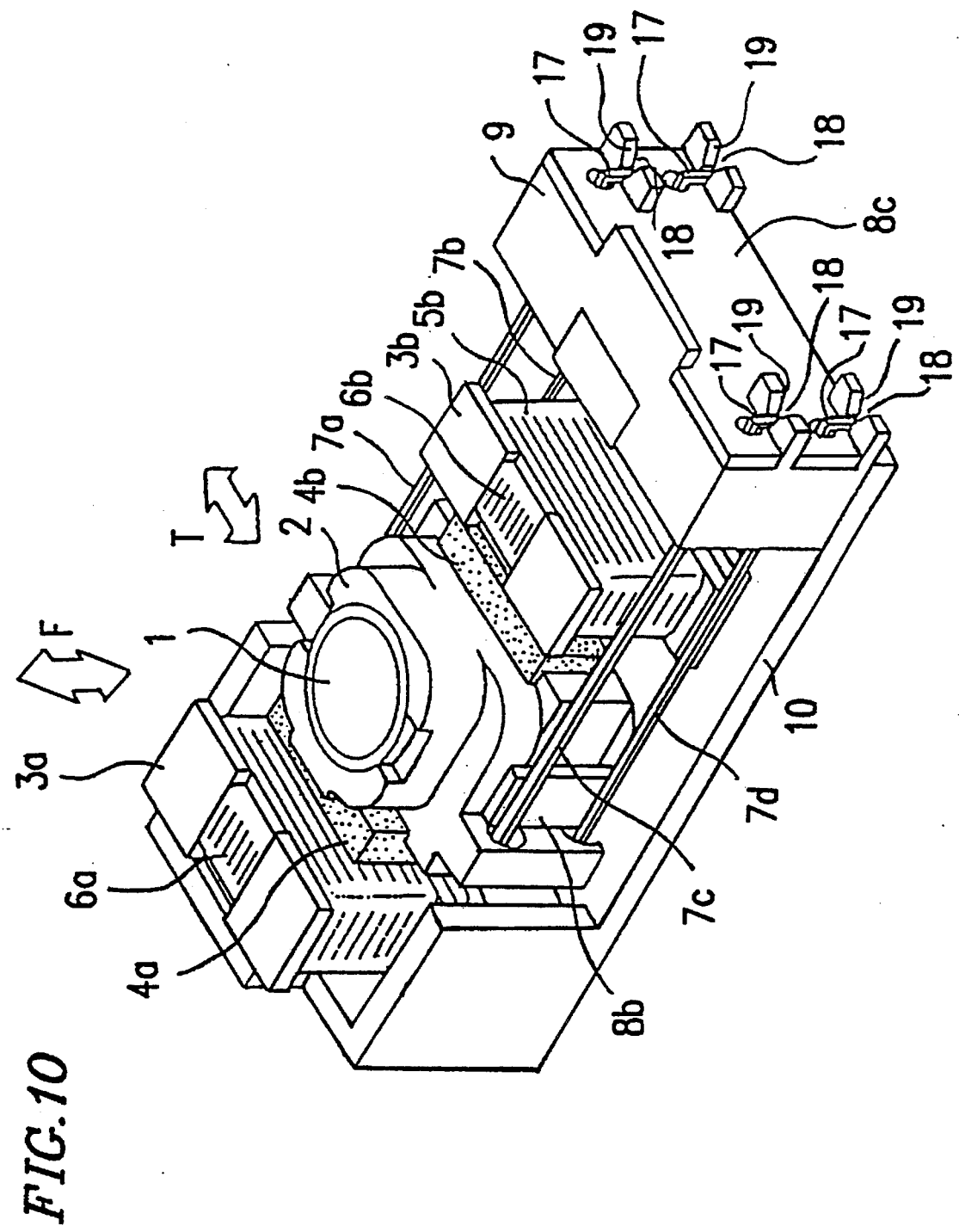
FIG. 10 is a perspective view showing a configuration for an objective lens actuator according to a second example of the present invention.
Figure 11:
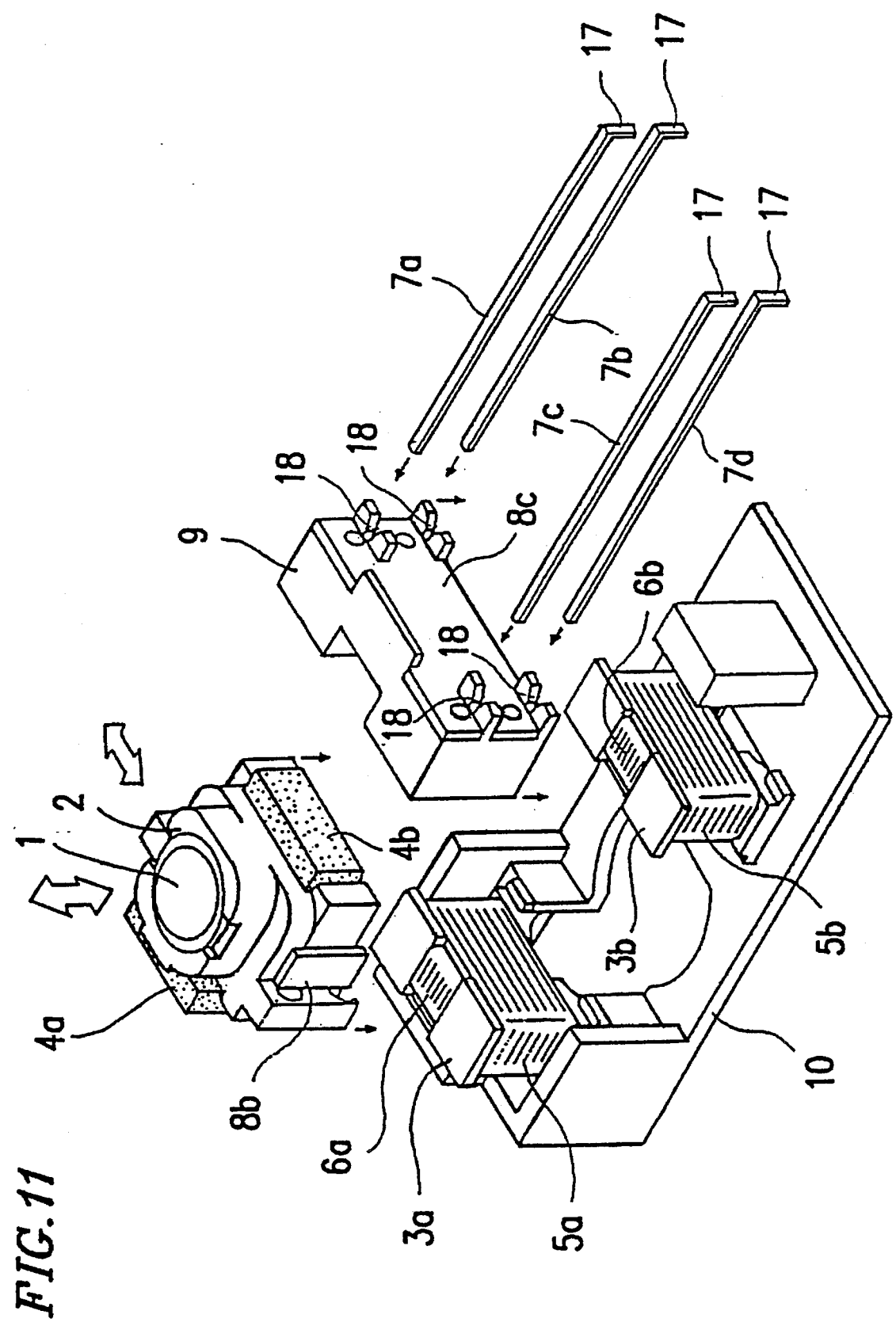
FIG. 11 is an exploded perspective view showing the objective lens actuator shown in FIG. 10 during the fabrication thereof.
Figure 12:
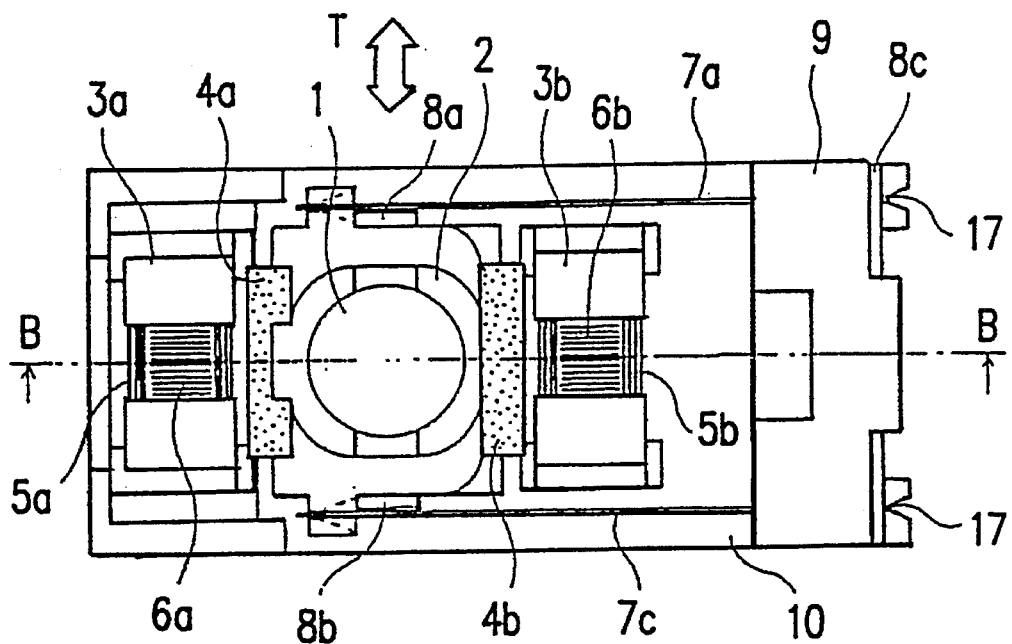
FIG. 12 is a plan view showing the objective lens actuator shown in FIG. 10.
Figure 13:
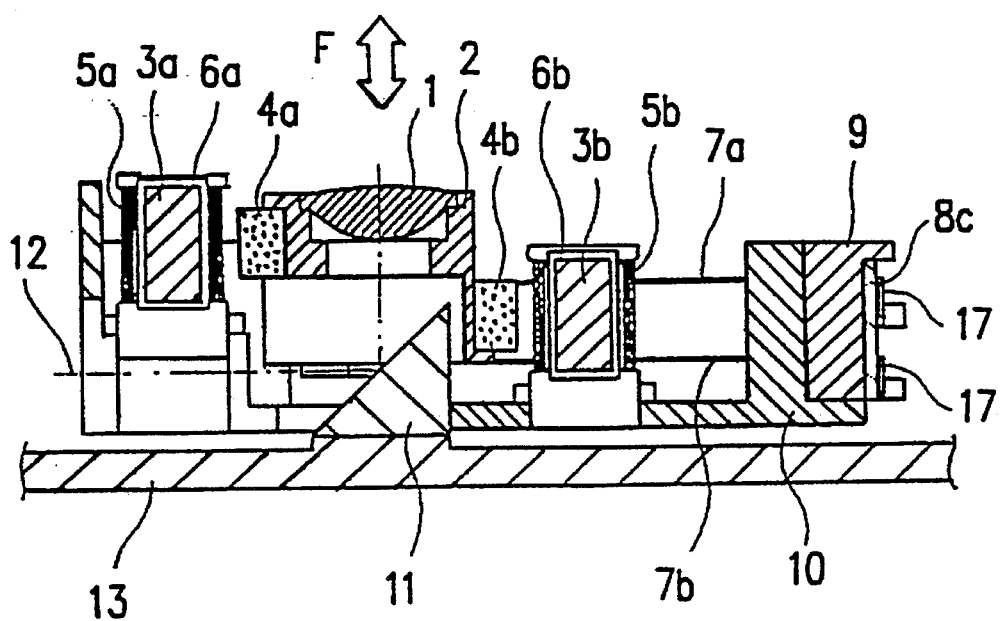
FIG. 13 is a cross-sectional view showing the objective lens actuator shown in FIG. 10, taken along line B—B in FIG. 12.

FIG. 10 is a perspective view showing an objective lens actuator according to the present example. FIG. 11 is an exploded perspective view showing the objective lens actuator shown in FIG. 10 during the fabrication thereof. FIG. 12 is a plan view showing the objective lens actuator shown in FIG. 10. FIG. 13 is a cross-sectional view showing the objective lens actuator of FIG. 10, taken along line B—B in FIG. 12.

The objective lens actuator according to the present example is, as well as the objective lens actuator of Example 1, of a magnet-driving type, which generally includes a magnet attached to a movable portion, a stationary magnetic yoke, and a focusing coil and a tracking coil directly wound around the stationary magnetic yoke. The configuration of the objective lens actuator being substantially the same as that of the objective lens actuator of Example 1, description thereof is omitted.

In accordance with the objective lens actuator of the present example, as well as the objective lens actuator of Example 1, correction of a focusing error due to up-down motions of the warps of a disk or a tracking error due to eccentricity, etc. of a disk is performed by moving a lens holder 2 along a focusing direction F or a tracking direction T. Specifically, the actuation of an objective lens 1 (carried by the lens holder 2) along the focusing direction F is realized by parallel translation of the lens holder 2 with the use of driving forces generated by an electrokinetic type transducer constituted by a magnetic yoke 3a, a magnet 4a, and a focusing coil 5a, and an electrokinetic type transducer constituted by a magnetic yoke 3b, a magnet 4b, and a focusing coil 5b. Similarly, the actuation of the objective lens 1 carried by the lens holder 2 along the tracking direction T is realized by parallel translation of the lens holder 2 with the use of driving forces generated by an electrokinetic type transducer constituted by a magnetic yoke 3a, a magnet 4a, and a tracking coil 6a, and an electrokinetic type transducer constituted by a magnetic yoke 3b, a magnet 4b, and a focusing coil 6b.

One difference between the objective lens actuator of the present example and that of Example 1 is the configuration of the metal rods used as elastic members 7a to 7d. As was described earlier, a conventional objective lens actuator has a problem in that a movable portion of the objective lens actuator may deviate from a neutral position due to the mass thereof when the disk is accessed in a state where the tracking direction T is closer to or coincides with the direction of gravity. The objective lens actuator of the present example overcomes the above-mentioned problem by prescribing the spring constants of the elastic members 7a to 7d to be large enough along the tracking direction T not to allow the elastic members 7a to 7d, or the metal rods, to drastically bend under the mass of the movable portion. As a result, any undesirable deviation of the movable portion from its neutral position is prevented.

In order to increase the spring constants of the elastic members 7a to 7d, the diameter of each of the elastic members 7a to 7d can be increased. However, increasing the diameter of each of the elastic members 7a to 7d also results in increasing the spring constants along the focusing direction F, as well as along the tracking direction T. This may lead to deterioration of the sensitivity of the focusing control, which generally requires higher sensitivity and accuracy than does the tracking control. Therefore, according to the present example, the elastic members 7a to 7d are composed of metal rods each having the same spring constant along the focusing F as that of the elastic members 7a to 7b in Example 1 but having a larger spring constant along the tracking direction T than that of the elastic members 7a to 7b in Example 1, as described below.

Figure 14:
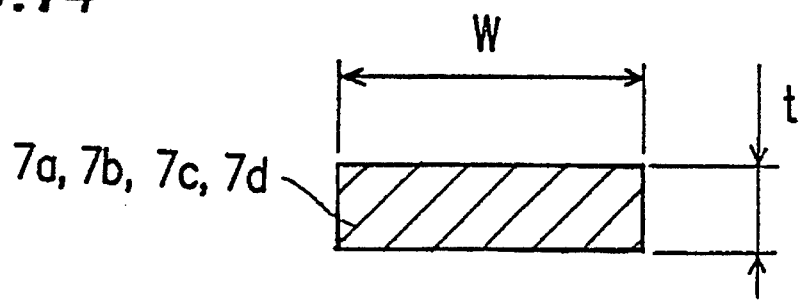
FIG. 14 is a cross-sectional view showing an elastic member according to a second example of the present invention.
Figure 15:
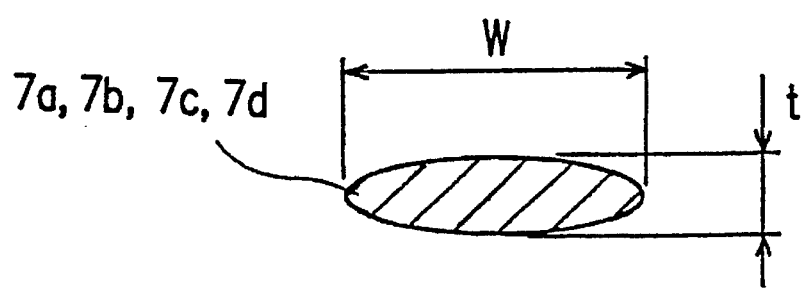
FIG. 15 is a cross-sectional view showing an elastic member according to a second example of the present invention.
Figure 16:
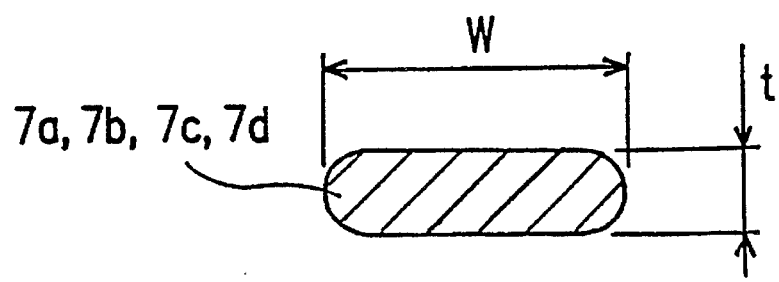
FIG. 16 is a cross-sectional view showing an elastic member according to a second example of the present invention.

FIGS. 14 to 16 show exemplary cross sections of the elastic member 7a to 7d according to the present example. FIG. 14 shows a rectangular configuration; FIG. 15 shows an oval configuration; and FIG. 16 shows a configuration which may be obtained by, for example, roll-pressing a wire having a circular cross section. Thus, as seen from FIGS. 14 to 16, the elastic members 7a to 7d according to the present example are composed of metal rods with a cross section having a width W (along the tracking direction T) which is slightly larger than a thickness t (along the focusing direction F), thereby constituting a flat or generally oblong shape. As a result, any displacement of the movable portion from a neutral position due to the mass thereof is restrained even when the disk is accessed in a state where the tracking direction T is closer to or coincides with the direction of gravity. Therefore, it is not necessary to design the movable portion of the objective lens actuator so as to be capable of moving in an excessively broad area in view of the possible displacement thereof along the tracking direction T; neither is it necessary to prescribe the diameter of the light beam 12 entering the reflection mirror 11 to be large. This naturally makes for the reduction in thickness of the objective lens actuator.

The configuration of the cross-section of the elastic members 7a to 7d is not limited to those shown in FIGS. 14, 15, and 16, but can be of any shape as long as it is a flat or generally oblong shape having a width W and a thickness t, the width W being sufficiently larger than the thickness t to realize a spring constant that prevents the elastic members 7a to 7d from drastically bending under the mass of the movable portion.

It is determined by various factors such as the mass of the movable portion how much larger the width W should be compared to the thickness t. In practice, however, the thickness t is predetermined to be in the vicinity of 100 μm. Moreover, the width W is predetermined to be equal to or larger than the thickness t; and the width W is predetermined to be equal to or smaller than a value twice as large as the thickness t. In other words, the width W and the thickness t are so predetermined as to satisfy the relationship t≦W≦2. For example, by using a metal rod having a cross section with a thickness t of 0.07 mm and a width W of 0.11 mm for each of the elastic members 7a to 7d, the displacement of the movable portion along the tracking direction T due to the mass thereof can be reduced to 0.12 mm, as compared with the displacement of 0.28 mm of the movable portion along the focusing direction F due to the mass thereof.

However, even if the displacement of the movable portion along the tracking direction T due to the mass thereof is reduced by thus increasing the spring constant along the tracking direction T of each of the elastic members 7a to 7d, displacement of the movable portion may still occur along the tracking direction T if any of the elastic members 7a to 7d shifts in the holes in the printed circuit board 8c. Therefore, it is required to accurately position the elastic members 7a to 7d so that they do not shift in their corresponding holes in the printed circuit board 8c.

Figure 17:
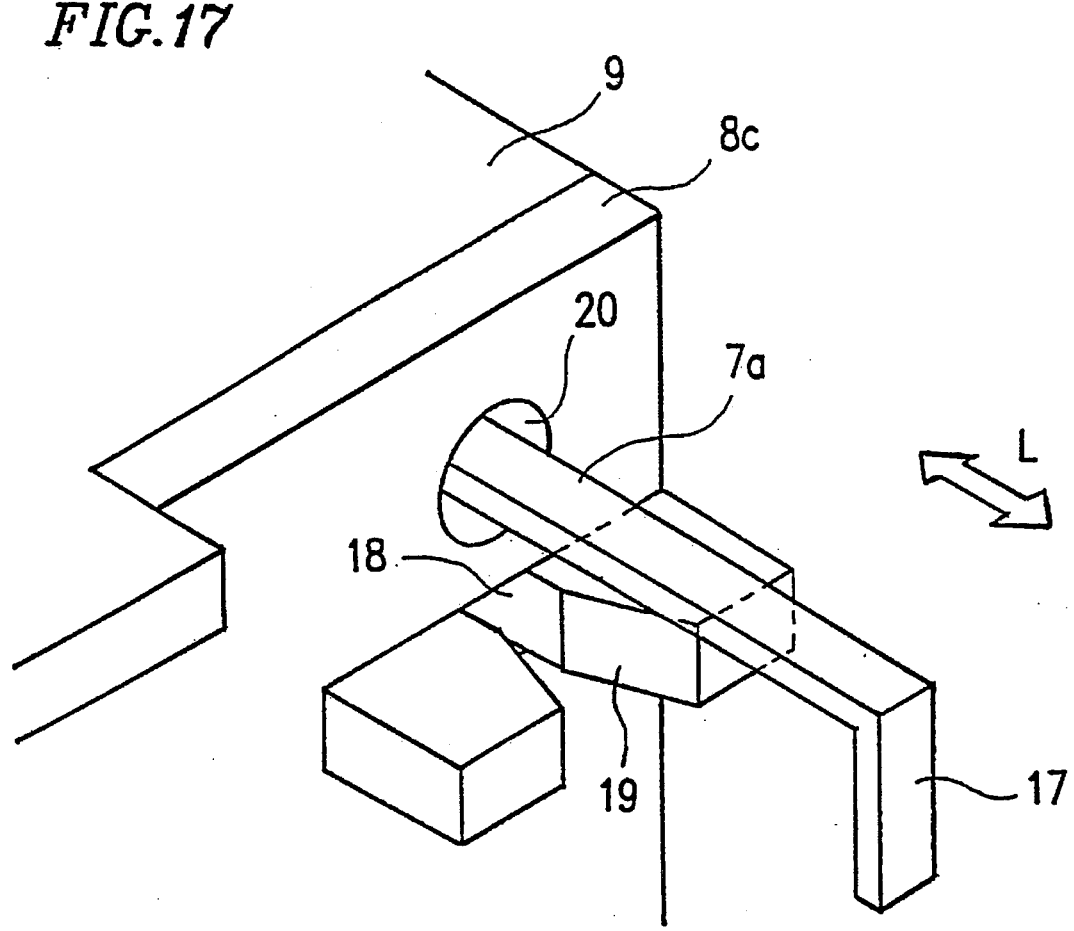
FIG. 17 is a perspective view showing a portion of the objective lens actuator essential to the positioning of an elastic member thereof, according to a second example of the present invention.

FIG. 17 shows a method for fixing the elastic members 7a to 7d on a stationary member 9 according to the present example. In the present example, an end portion of each of the elastic members 7a to 7d is bent along the focusing direction F so as to form a bent portion 17, and the bent portion 17 is inserted into a groove 18 formed in the stationary member 9, the groove 18 having substantially the same width as the width of the bent portion 17 along the tracking direction. Thus, an accurate positioning of the elastic members 7a to 7d can be realized. Each groove 18 has a tapered portion 19 extending from the mouth of the groove 18 part of the way towards the printed circuit board 8c. Thus, by simply dropping the elastic members 7a to 7d through the holes in the printed circuit board 8c with a certain accuracy, the bent portions 17 engage with the grooves 18 so that the elastic members 7a to 7d are fixed on the printed circuit board 8c. As will be appreciated, the positioning of the elastic members 7a to 7d is facilitated according to the present example.

Figure 18:
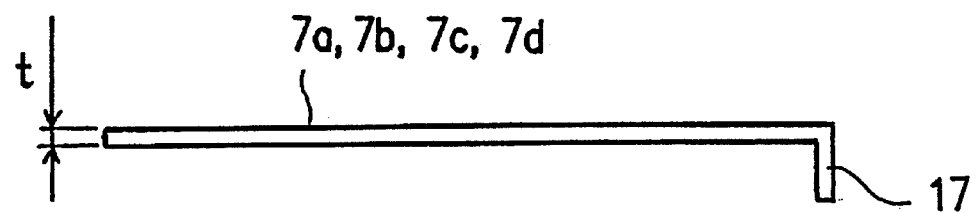
FIG. 18 is plan view showing an elastic member according to a second example of the present invention.

Similar effects can be obtained by, as shown in FIG. 18 forming the elastic members 7a to 7d of hook-shape plate springs obtained by etching, pressing, etc., instead of metal rods with bent end portions. Similar effects can also be obtained in cases where the printed circuit board 8c is formed of a metal plate having integrally-formed grooves.

Figure 19:
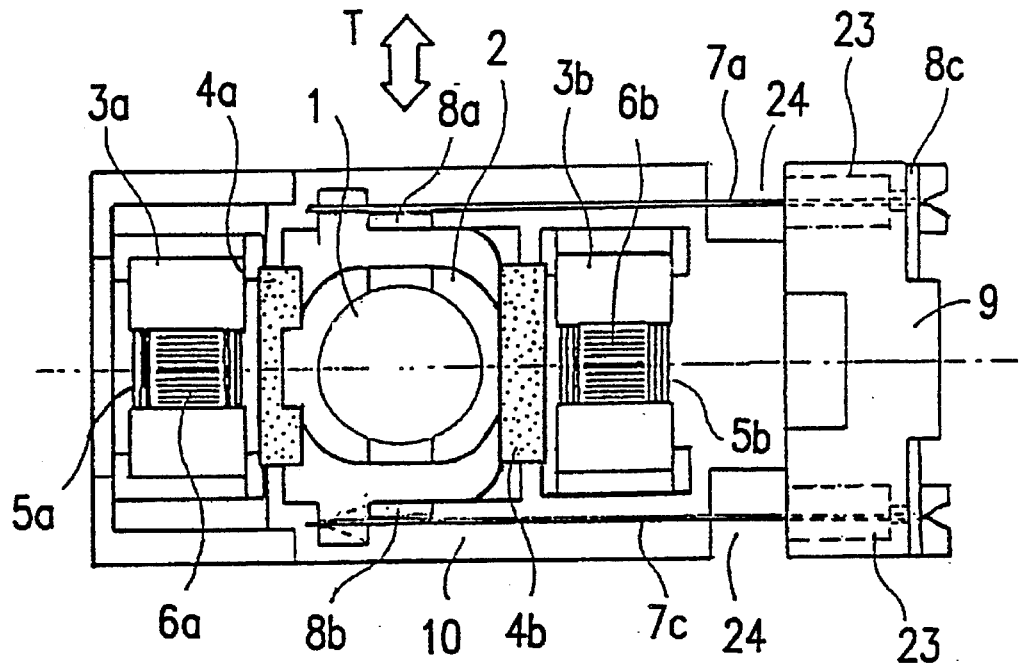
FIG. 19 is a plan view showing a base according to a second example of the present invention.
Figure 20:
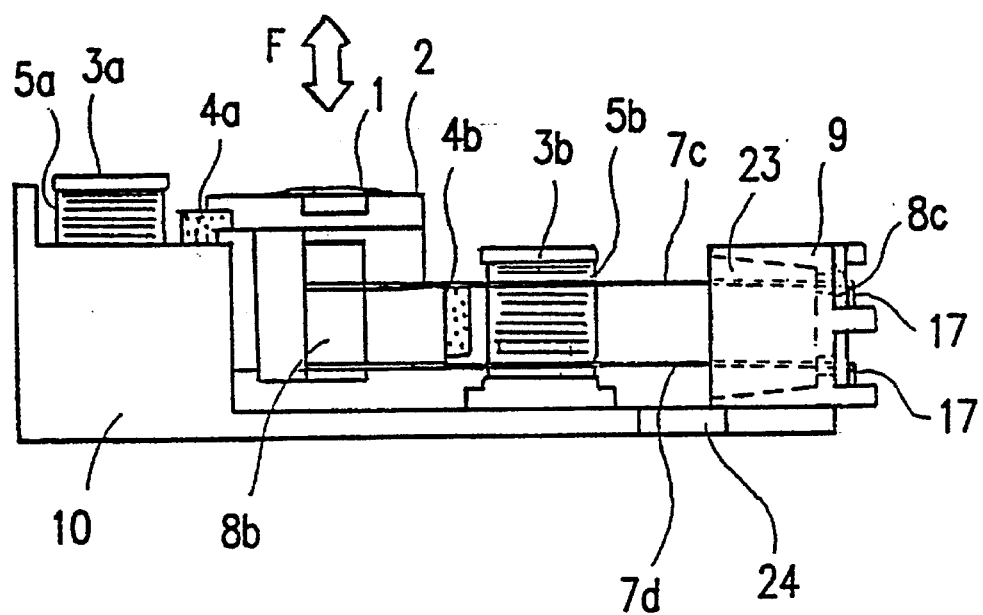
FIG. 20 is a front view showing a stationary member according to a second example of the present invention.

FIG. 19 shows the way the elastic members 7a to 7d are attached to the stationary member 9. In the present example, cavities 23 are provided for the stationary member 9. Positioning and stabilization of the elastic members 7a to 7d can be realized by inserting the corresponding ones of the elastic members 7a to 7d into the cavities 23 and by engaging portions of the elastic members 7a to 7d that have protruded from the cavities 23 with the grooves 18. A UV-ray (Ultra Violet ray) curable type viscoelastic material is filled in the cavities 23 so as to reduce the Q value of the first-order resonance frequency. The viscoelastic material in the cavities 23 is cured by UV-rays radiated through notches 24 formed in the base 10 in the vicinity of the stationary member 9. Moreover, by tapering the cavities 23 as shown in FIG. 20, the elastic members 7a to 7d can be prevented from coming in contact with the stationary member 9 even when the movable portion is actuated along the focusing direction F.

Figure 21:
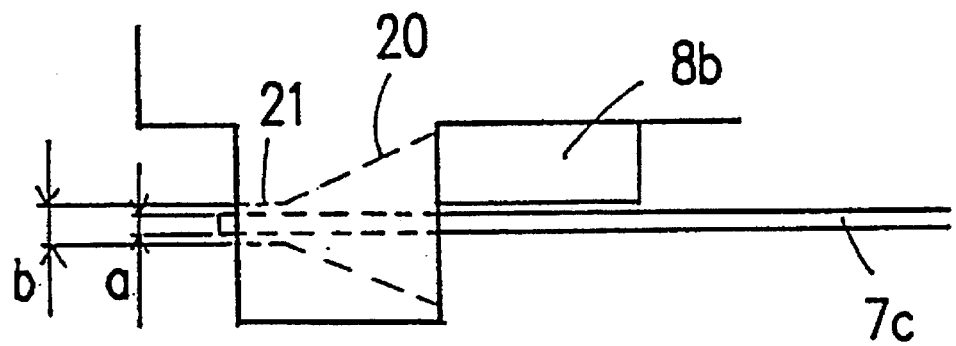
FIG. 21 is a plan view showing a portion of the objective lens actuator essential to the positioning of an elastic member thereof, according to a second example of the present invention.

As for the attachment of the elastic members 7a to 7d to the lens holder 2, as shown in FIG. 21, it can be facilitated by providing a tapered guide portion 20 for the mouth of each of positioning holes 21 formed in the lens holder 2, into which the elastic members 7a to 7d are inserted; the elastic members 7a to 7d are dropped into the guide portions 20 in such a manner that the elastic members 7a to 7d extend in the direction of gravity, so that the ends of the elastic members 7a to 7d are inserted into their corresponding positioning holes 21, whereby the ends of the elastic members 7a to 7d are fixed on the lens holder 2.

Figure 22:
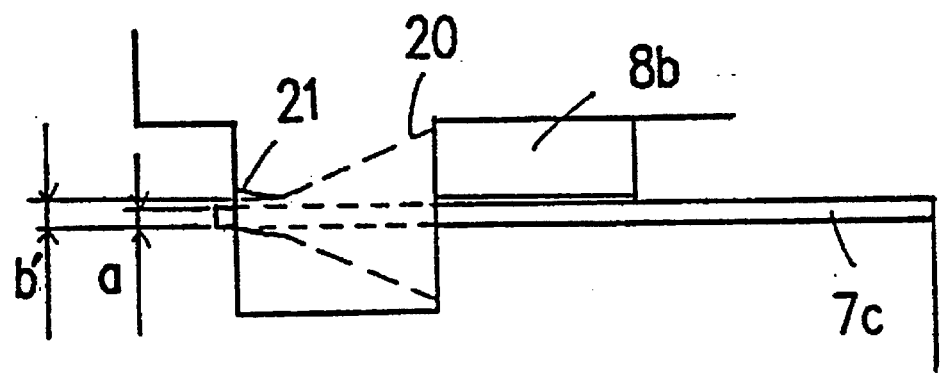
FIG. 22 is a plan view showing a portion of the objective lens actuator essential to the positioning of an elastic member thereof, according to a second example of the present invention.

The axis of each positioning hole 21 does not need to coincide with the direction in which each of the elastic members 7a to 7d extends as shown in FIG. 21. Instead, as shown in FIG. 22, each positioning hole 21 may be formed in the lens holder 2 in such a manner that the axis of the positioning hole 21 is at a predetermined angle with the direction in which the elastic members 7a to 7d extend. In this case, the clearance b-a between each of the elastic members 7a to 7d and each positioning hole 21 (where b and a are defined as the respective diameters of the positioning holes 21 and the elastic members 7a to 7d) as shown in FIG. 21 is reduced to b'-a as shown in FIG. 22. As a result, the positioning accuracy of the elastic members 7a to 7d improves.

As has been described, in an optical information recording/reproducing apparatus according to the present invention, an objective lens actuator is used in which a plurality of electrokinetic type transducers are provided on both sides of a movable portion in such a manner that a middle point between driving forces generated by these electrokinetic type transducers coincides with the center of mass of the movable portion. As a result, the displacement-frequency characteristics are prevented from deteriorating, whereby stable servo controls can be realized. Moreover, the electrokinetic type transducer which is closer to the side where a light beam 12 enters a reflection mirror 11 is disposed closer to the recording medium than is the other electrokinetic type transducer. As a result, the total thickness of the objective lens actuator and an optical unit tray 13 can be reduced without allowing the optical path for the light beam 12 to be obstructed, as if only one electrokinetic type transducer were used.

Moreover, since elastic members 7a to 7d composed of metal rods or plate springs each having a flat cross section are used, any displacement of the movable portion along the tracking direction T due to the mass thereof is restrained even when the recording medium is accessed in a state where the tracking direction T is closer to or coincides with the direction of gravity. Therefore, it is not necessary to design the movable portion of the objective lens actuator so as to be capable of moving in an excessively broad area in view of the possible displacement thereof along the tracking direction T; neither is it necessary to prescribe the diameter of the light beam 12 to be excessively large. As a result, the total thickness of the objective lens actuator and the optical unit tray 13 can be reduced.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical information recording/reproducing apparatus for optically writing and reproducing information on a disk-shape recording medium, the optical information recording/reproducing apparatus comprising:

a base;

an objective lens for converging a light beam on the disk-shape recording medium, an optical axis of the objective lens being perpendicular to the disk-shape recording medium;

an actuator for actuating the objective lens along an optical axis direction in which the optical axis of the objective lens extends and along a radial direction of the disk-shape recording medium, wherein the actuator is fixed on the base and includes supporting means for supporting the objective lens, and a first electrokinetic type transducing means and a second electrokinetic type transducing means for driving the supporting means along at least one of the optical axis direction and the radial direction of the disk-shape recording medium, the first and second electrokinetic type transducing means interposing the supporting means, and a distance between the first electrokinetic type transducing means and the base being different from a distance between the second electrokinetic type transducing means and the base; and an optical member for directing a light beam to travel between the first electrokinetic type transducing means and the base and to be incident on the objective lens.

2. An optical information recording/reproducing apparatus according to claim 1, wherein the distance between the first electrokinetic type transducing means and the base is larger than the distance between the second electrokinetic type transducing means and the base.

3. An optical information recording/reproducing apparatus according to claim 1, wherein each of the first and second electrokinetic type transducing means comprises a magnet, a magnet yoke, and a plurality of driving coils disposed in a magnetic field generated by the magnet and the magnetic yoke.

4. An optical information recording/reproducing apparatus according to claim 3, wherein the magnet is provided on the supporting means; the magnetic yoke is fixed on the base; and a first driving force generated by the first electrokinetic type transducing means and a second driving force generated by the second electrokinetic type transducing means are in symmetrical positions with respect to a center of mass of a movable portion including the objective lens, the supporting means, and the magnet.

5. An optical information recording/reproducing apparatus according to claim 4, wherein the magnet comprised by the first electrokinetic type transducing means and the magnet comprised by the second electrokinetic type transducing means are disposed in such a manner that different poles thereof oppose each other.

6. An optical information recording/reproducing apparatus according to claim 4, wherein the supporting means comprises a magnetic member interposed between the magnet comprised by the first electrokinetic type transducing means and the magnet comprised by the second electrokinetic type transducing means.

7. An optical information recording/reproducing apparatus according to claim 6, wherein the supporting means comprises an aperture for narrowing the light beam entering the objective lens so as to have a certain diameter, the aperture being a part of the magnetic member.

8. An optical information recording/reproducing apparatus according to claim 4, wherein the supporting means comprises a concave or convex portion for positioning the magnet with respect to the supporting means.

9. An optical information recording/reproducing apparatus according to claim 3, wherein the plurality of driving coils are provided on the supporting means; the magnetic yoke is fixed on the base; and a first driving force generated by the first electrokinetic type transducing means and a second driving force generated by the second electrokinetic type transducing means are in symmetrical positions with respect to a center of mass of a movable portion including the objective lens, the supporting means, and the plurality of driving coils.

10. An optical information recording/reproducing apparatus according to claim 3, wherein the magnet comprised by the first electrokinetic type transducing means is shorter along the optical axis direction than the magnet comprised by the second electrokinetic type transducing means is along the optical axis direction.

11. An optical information recording/reproducing apparatus according to claim 3, wherein the plurality of driving coils comprise an optical-axis-direction driving coil for actuating the objective lens along the optical axis direction and a radial-direction driving coil for actuating the objective lens along the radius direction of the disk-shape recording medium.

12. An optical information recording/reproducing apparatus according to claim 11, wherein the radial-direction driving coil comprises split halves split along the radial direction, the split halves being wound around the magnetic yoke.

13. An optical information recording/reproducing apparatus according to claim 1, wherein the actuator further comprises a stationary member fixed on the base, and a plurality of elastic members for supporting the supporting means, and wherein the plurality of elastic members are disposed substantially in parallel to one another and each include a first end attached to the supporting means and a second end attached to the stationary member.

14. An optical information recording/reproducing apparatus according to claim 13, wherein the plurality of elastic members consist of four elastic members, and a spring constant of each of two of the four elastic members that are disposed closer to the disk-shape recording medium is different from a spring constant of each of the other two of the four elastic members.

15. An optical information recording/reproducing apparatus according to claim 13, wherein each of the first ends of the plurality of elastic members is disposed closer to the disk-shape recording medium than is a corresponding one of the second ends of the plurality of elastic members.

16. An optical information recording/reproducing apparatus according to claim 13, wherein the supporting means comprises a substrate to which the first ends of the plurality of elastic members are attached, and the stationary member comprises a substrate to which the second ends of the plurality of elastic members are attached.

17. An optical information recording/reproducing apparatus according to claim 16, wherein the substrates are printed circuit boards; the plurality of elastic members are metal rods; and the first and the second ends of the plurality of elastic members are soldered to the printed circuit boards.

18. An optical information recording/reproducing apparatus according to claim 17, wherein the substrate is insert molded onto the supporting means and the stationary member.

19. An optical information recording/reproducing apparatus according to claim 16, wherein the substrates are metal plates; the plurality of elastic members are metal rods; and the first and the second ends of the plurality of elastic members are soldered to the printed circuit boards.

20. An optical information recording/reproducing apparatus according to claim 19, wherein the substrate is insert molded onto the supporting means and the stationary member.

21. An optical information recording/reproducing apparatus according to claim 13, wherein each of the elastic members has a cross section having a predetermined thickness and a predetermined width, the predetermined thickness being different from the predetermined width.

22. An optical information recording/reproducing apparatus according to claim 13, wherein at least one of the first and second ends of the plurality of elastic members are bent.

23. An optical information recording/reproducing apparatus according to claim 22, wherein the stationary member comprises at least one groove for positioning the second ends of the plurality of elastic members.

24. An optical information recording/reproducing apparatus according to claim 23, wherein the stationary member comprises a substrate to which the second ends of the plurality of elastic members are attached, and the at least one groove is formed in the substrate.

25. An optical information recording/reproducing apparatus according to claim 23, wherein the at least one groove is tapered.

26. An optical information recording/reproducing apparatus according to claim 13, wherein the plurality of elastic members are plate springs each having an L-shape.

27. An optical information recording/reproducing apparatus according to claim 26, wherein the stationary member comprises at least one groove for positioning the second ends of the plurality of elastic members.

28. An optical information recording/reproducing apparatus according to claim 27, wherein the stationary member comprises a substrate to which the second ends of the plurality of elastic members are attached, and the at least one groove is formed in the substrate.

29. An optical information recording/reproducing apparatus according to claim 27, wherein the at least one groove is tapered.

30. An optical information recording/reproducing apparatus according to claim 13, wherein the stationary member comprises at least one concave portion for accommodating the plurality of elastic members, a viscoelastic material which cures when irradiated with a UV-ray being filled in the at least one concave portion.

31. An optical information recording/reproducing apparatus according to claim 30, wherein the at least one concave portion of the stationary member is tapered.

32. An optical information recording/reproducing apparatus according to claim 30, wherein at least one notch is formed in the base in a vicinity of the stationary member.

33. An optical information recording/reproducing apparatus according to claim 13, wherein the plurality of elastic members have a general rod shape, and substantially conical holes for positioning the first ends of the plurality of elastic members are formed in the supporting means.

34. An optical information recording/reproducing apparatus according to claim 13, wherein the plurality of elastic members have a general rod shape, and substantially conical holes for positioning the second ends of the plurality of elastic members are formed in the stationary member.

35. An optical information recording/reproducing apparatus according to claim 13, wherein the plurality of elastic members have a general rod shape, and substantially cylindrical holes for positioning the first ends of the plurality of elastic members are formed in the supporting means, a center axis of each of the cylindrical holes is at an angle with a direction in which the plurality of elastic members extend.

36. An optical information recording/reproducing apparatus according to claim 13, wherein each of the second ends of the plurality of elastic members has a diameter larger than other portions of each of the plurality of elastic members.

37. An optical information recording/reproducing apparatus according to claim 1, wherein the supporting means comprises a liquid crystal polymer.

38. An optical information recording/reproducing apparatus according to claim 1, wherein the supporting means further comprises an adhesive receiving portion into which an adhesive for bonding the objective lens to the supporting means is filled.

* * * * *